(12) United States Patent
Le Leannec et al.

(10) Patent No.: US 12,155,827 B2
(45) Date of Patent: Nov. 26, 2024

(54) TEXTURE-BASED PARTITIONING DECISIONS FOR VIDEO COMPRESSION

(71) Applicant: INTERDIGITAL VC HOLDINGS, INC., Wilmington, DE (US)

(72) Inventors: Fabrice Le Leannec, Betton (FR); Franck Galpin, Thorigne-Fouillard (FR); Fabien Racape, San Francisco, CA (US); Sunil Jaiswal, Saarbrucken (DE)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/860,038

(22) Filed: Jul. 7, 2022

(65) Prior Publication Data

US 2022/0353502 A1   Nov. 3, 2022

Related U.S. Application Data

(63) Continuation of application No. 16/771,094, filed as application No. PCT/US2018/065076 on Dec. 12, 2018, now Pat. No. 11,412,220.

(30) Foreign Application Priority Data

Dec. 14, 2017  (EP) .................... 17306774
Jan. 26, 2018  (EP) .................... 18305069
Jan. 26, 2018  (EP) .................... 18305070

(51) Int. Cl.
*H04N 19/119*  (2014.01)
*H04N 19/14*  (2014.01)
(Continued)

(52) U.S. Cl.
CPC ........... *H04N 19/119* (2014.11); *H04N 19/14* (2014.11); *H04N 19/176* (2014.11); *H04N 19/146* (2014.11)

(58) Field of Classification Search
CPC ....... G01S 17/10; G01S 17/66; G01C 15/002; G03H 1/041; G03H 1/0465
See application file for complete search history.

(56) References Cited

U.S. PATENT DOCUMENTS 8,515,193 B1   8/2013   Han et al.
8,665,951 B2   3/2014   Ameres et al.
(Continued)

FOREIGN PATENT DOCUMENTS

CN   100479527 C   4/2009
CN   103999465 A   8/2014
(Continued)

OTHER PUBLICATIONS

Cassa, "Fast Rate Distortion Optimization for the Emerging HEVC Standard", 2012 Picture Coding Symposium, Krakow, Poland, May 7-9, 2012, pp. 493-496.
(Continued)

*Primary Examiner* — Nam D Pham
(74) *Attorney, Agent, or Firm* — Condo Roccia Koptiw LLP

(57) ABSTRACT

A block of video data is split using one or more of several possible partition operations by using the partitioning choices obtained through use of a texture-based image partitioning. In at least one embodiment, the block is split in one or more splitting operations using a convolutional neural network. In another embodiment, inputs to the convolutional neural network come from pixels along the block's causal borders. In another embodiment, boundary information, such as the location of partitions in spatially neighboring blocks, is used by the texture analysis. Methods, apparatus, and signal embodiments are provided for encoding.

20 Claims, 25 Drawing Sheets

(51) Int. Cl.
  *H04N 19/146* (2014.01)
  *H04N 19/176* (2014.01)

(56) References Cited

U.S. PATENT DOCUMENTS

| | | | |
|---|---|---|---|
| 9,706,219 | B2 | 7/2017 | Henry et al. |
| 9,883,203 | B2 | 1/2018 | Chien et al. |
| 10,057,586 | B2 | 8/2018 | Gu et al. |
| 2004/0165765 | A1 | 8/2004 | Sung et al. |
| 2015/0189269 | A1* | 7/2015 | Han ................ H04N 19/119 375/240.12 |
| 2016/0065959 | A1 | 3/2016 | Stobaugh et al. |
| 2016/0065964 | A1 | 3/2016 | Zhang et al. |
| 2016/0134857 | A1 | 5/2016 | An et al. |
| 2016/0174902 | A1 | 6/2016 | Georgescu et al. |
| 2017/0118486 | A1 | 4/2017 | Rusanovskyy |
| 2017/0214913 | A1 | 7/2017 | Zhang et al. |
| 2017/0280144 | A1 | 9/2017 | Dvir et al. |
| 2018/0089493 | A1 | 3/2018 | Nirenberg |
| 2018/0227585 | A1 | 8/2018 | Wang et al. |
| 2019/0007686 | A1 | 1/2019 | Galpin et al. |
| 2019/0166380 | A1 | 5/2019 | Chen et al. |
| 2019/0230354 | A1 | 7/2019 | Kim |
| 2020/0145661 | A1 | 5/2020 | Jeon et al. |

FOREIGN PATENT DOCUMENTS

| | | |
|---|---|---|
| CN | 104041039 A | 9/2014 |
| CN | 106162167 A | 11/2016 |
| CN | 106464855 A | 2/2017 |
| CN | 107197260 A | 9/2017 |
| KR | 10-2017-0059040 A | 5/2017 |
| TW | 201724853 A | 7/2017 |
| WO | 2010/039731 A2 | 4/2010 |
| WO | 2015/006884 A1 | 1/2015 |
| WO | 2015/190839 A1 | 12/2015 |
| WO | 2015/200820 A1 | 12/2015 |
| WO | 2019/009449 A1 | 1/2019 |

OTHER PUBLICATIONS

Galpin et al., "AHG9: CNN-Based Driving of Block Partitioning for Intra Slices Encoding", JVET-J0034, Technicolor, The Joint Video Exploration Team of ISO/IEC JTC1/SC29/WG11 and ITU-T SG 16, San Diego, Apr. 3, 2018, 21 pages.

Jin et al., "CNN Oriented Fast QTBT Partition Algorithm for JVET Intra Coding", 2017 IEEE Visual Communications and Image Processing (VCIP), St. Petersburg, Florida, USA, Dec. 10-13, 2017, 4 pages.

Laude et al., "Deep Learning-Based Intra Prediction Mode Decision for HEVC", 2016 Picture Coding Symposium (PCS), Dec. 4, 2016, 5 pages.

Leng et al., "Content Based Hierarchical Fast Coding Unit Decision Algorithm for HEVC", 2011 International Conference on Multimedia and Signal Processing, May 14, 2011, pp. 56-59.

Li et al., "A Deep Convolutional Neural Network Approach for Complexity Reduction on Intra-Mode HEVC", Proceedings of the IEEE International Conference on Multimedia and Expo (ICME) 2017, Jul. 10-14, 2017, pp. 1255-1260.

Liu et al., "CU Partition Mode Decision for HEVC Hardwired Intra Encoder Using Convolution Neural Network", IEEE Transactions on Image Processing, vol. 25, No. 11, Nov. 2016, pp. 5088-5103.

Ruiz et al., "Fast CU Partitioning Algorithm for HEVC Intra Coding Using Data Mining", Multimedia Tools and Applications, vol. 76, No. 1, Nov. 21, 2015, pp. 861-894.

Shen et al., "CU Splitting Early Termination Based on Weighted SVM", EURASIP Journal on Image and Video Processing, vol. 2013, No. 1, Dec. 2013, pp. 1-11.

Sun et al., "Efficient Coding Unit Partition Strategy for HEVC Intracoding", Journal of Electronic Imaging, vol. 26, No. 4, Jul.-Aug. 2017, pp. 043023-1-043023-8.

Ballé et al., "Models for Static and Dynamic Texture Synthesis in Image and Video Compression", IEEE Journal of Selected Topics in Signal Processing, vol. 5, No. 7, 2011, pp. 1-15.

Chen et al., "Algorithm Description of Joint Exploration Test Model 7 (JEM7)", JVET-G1001-V1, Editors, Joint Video Exploration Team (JVET) of ITU-T SG 16 WP 3 and ISO/IEC JTC 1/SC 29/WG 11, 7th Meeting: Torino, IT, Jul. 13-21, 2017, 49 pages.

ITU-T, "Advanced Video Coding for Generic Audiovisual Services", Recommendation ITU-T H.264, Series H: Audiovisual and Multimedia Systems, Infrastructure of Audiovisual Services—Coding of Moving Video, Feb. 2014, 790 pages.

ITU-T, "High Efficiency Video Coding", Recommendation ITU-T H.265, Series H: Audiovisual and Multimedia Systems, Infrastructure of Audiovisual Services—Coding of Moving Video, Oct. 2014, 540 pages.

Leannec et al., "Asymmetric Coding Units in QTBT", JVET-D0064, Technicolor, Joint Video Exploration Team (JVET) of ITU-T SG 16 WP 3 and ISO/IEC JTC 1/SC 29/WG 11, 4th Meeting: Chengdu, CN, Oct. 15-21, 2016, 10 pages.

Li et al., "Multi-Type-Tree", JVET-D0117, Qualcomm Inc., Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-3.

Shen et al., "CU Splitting Early Termination Based on Weighted SVM", EURASIP Journal on Image and Video Processing, vol. 2013, No. 1, Jan. 9, 2013, 11 pages.

* cited by examiner

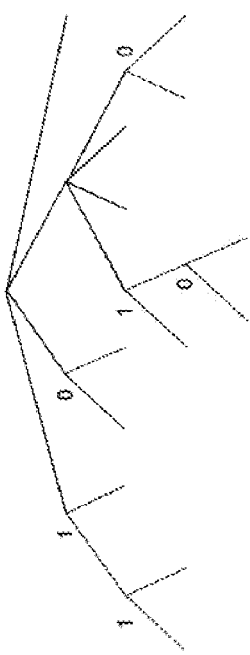
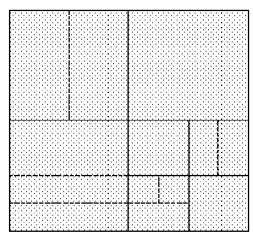
Figure 4

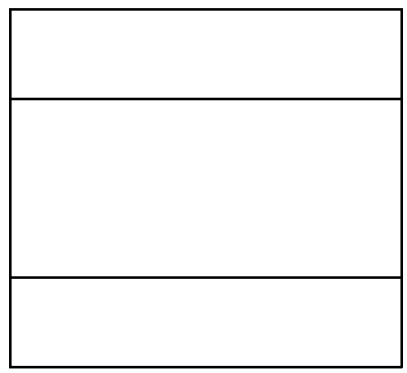 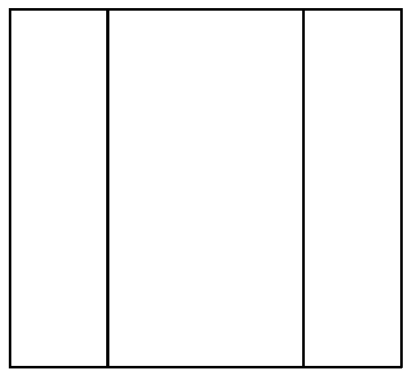
HOR_TRIPLE    VER_TRIPLE
Figure 6

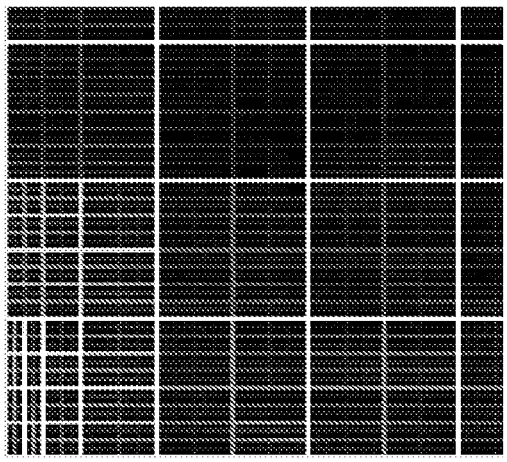
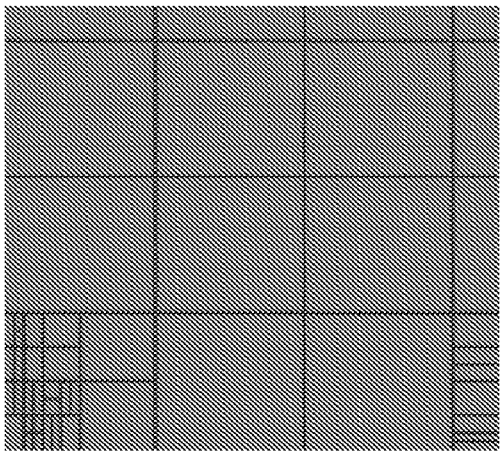
Figure 14

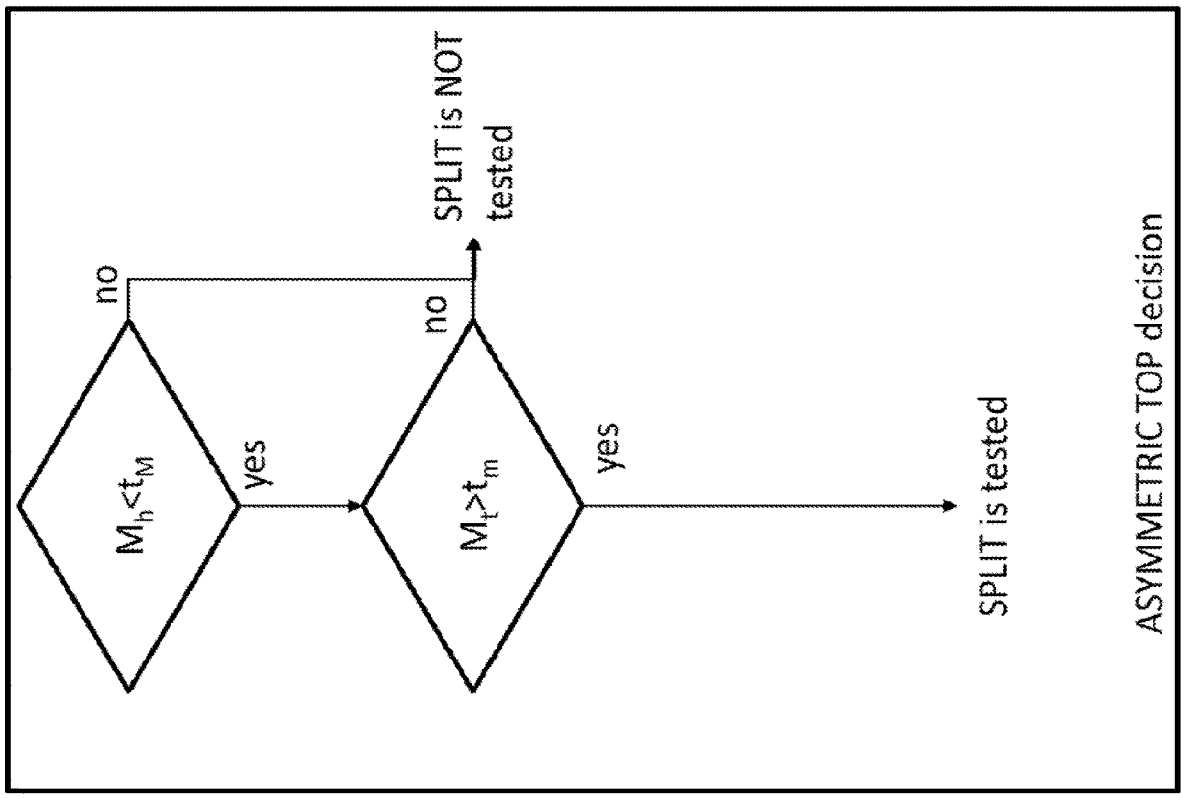

TEXTURE-BASED PARTITIONING DECISIONS FOR VIDEO COMPRESSION

CROSS REFERENCE TO RELATED APPLICATIONS

This application is a continuation application of U.S. Non-Provisional application Ser. No. 16/771,094, filed Jun. 9, 2020, which is the National Stage Entry under 35 U.S.C. § 371 of Patent Cooperation Treaty Application No. PCT/US2018/065076, filed Dec. 12, 2018, which claims priority to European Patent Application Nos. 17306774.5, filed Dec. 14, 2017, 18305069.9, filed Jan. 26, 2018, and 18305070.7, filed Jan. 26, 2018, the contents of which are hereby incorporated by reference herein in their entireties.

FIELD OF THE INVENTION

The present principles relate to the field of video compression.

BACKGROUND OF THE INVENTION

In the HEVC video compression standard (International Telecommunication Union, ITU-T H.265 High Efficiency Video Coding), a picture is divided into so-called Coding Tree Units (CTU), whose size is typically 64×64, 128×128, or 256×256 pixels.

Each CTU is represented by a Coding Tree in the compressed domain. This is a quad-tree division of the CTU, where each leaf is called a Coding Unit (CU), as shown in FIG. 1.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 2.

The Partitioning of a Coding Unit into Prediction Unit(s) is done according to the partition type, signaled in the bit-stream. For Intra coding unit, only the partition types 2N×2N and N×N, illustrated in FIG. 3, are used. This means only square Prediction Units are used in Intra Coding Units.

On the contrary, Inter Coding Units can use all partition types shown in FIG. 3.

According to the HEVC standard, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

New emerging video compression tools include a Coding Tree Unit representation in the compressed domain, proposed in order to represent picture data in a more flexible way in the compressed domain. The advantage of this flexible representation of the coding tree is that it provides increased compression efficiency compared to the CU/PU/TU arrangement of the HEVC standard.

The Quad-Tree plus Binary-Tree (QTBT) coding tool provides this increased flexibility. It consists in a coding tree where coding units can be split both in a quad-tree and in a binary-tree fashion. Such coding tree representation of a Coding Tree Unit is illustrated in FIG. 4. The QTBT representation on a block is illustrated in FIG. 5.

The splitting of a coding unit is decided on the encoder side through a rate distortion optimization procedure which consists in determining the QTBT representation of the CTU with minimal rate distortion cost.

In the QTBT technology, a CU has either square or rectangular shape. The size of coding unit is always a power of 2, and typically goes from 4 to 256.

In addition to this variety of rectangular shapes for a coding unit, this new CTU representation has the following different characteristics compared to HEVC.

First, the QTBT decomposition of a CTU is made of two stages: first the CTU is split in a quad-tree fashion, then each quad-tree leaf can be further divide in a binary fashion. This is illustrated on the right of FIG. 4 where solid lines represent the quad-tree decomposition phase and dashed lines represent the binary decomposition that is spatially embedded in the quad-tree leaves.

Second, in intra slices, the Luma and Chroma block partitioning structure is separated, and decided independently.

Next, no more CU partitioning into predictions units or transform units is employed. In other words, each Coding Unit is systematically made of a single prediction unit (previously 2N×2N prediction unit partition type) and single transform unit (no division into a transform tree).

However, further improved compression efficiency is needed for QTBT technology.

SUMMARY OF THE INVENTION

These and other drawbacks and disadvantages of the prior art are addressed by at least one of the described embodiments, which are directed to a method and apparatus for coding or decoding a block of video data. In at least one embodiment, it is proposed to use a texture-based technique to generate a set of split partition probabilities.

According to at least one general embodiment described herein, there is provided a method for coding a block of video data. The method comprises generating a set of partition possibilities using a texture-based analysis of a block of image data based on partition boundary probabilities; partitioning said block of image data into two or more smaller blocks using said set of partition possibilities; and, encoding at least one smaller block.

According to another general embodiment described herein, there is provided an apparatus for coding a block of video data. The apparatus comprises a memory, and a processor, configured to generate a set of partition possibilities using a texture-based analysis of a block of image data based on partition boundary probabilities; partition said block of image data into two or more smaller blocks using said set of partition possibilities; and, encode at least one smaller block.

According to another aspect described herein, there is provided a nontransitory computer readable storage medium containing data content generated according to the method of any one of the described method embodiments, or by the apparatus of any one of the described apparatus embodiments for playback using a processor.

According to another aspect described herein, there is provided a signal comprising video data generated according to the method of any one of the described method embodiments for coding a block of video data, or by the apparatus of any one of the described apparatus embodiments for coding a block of video data, for playback using a processor.

According to another aspect described herein, there is provided a computer program product comprising instructions which, when the program is executed by a computer, cause the computer to carry out the method of any one of the described method embodiments.

These and other aspects, features and advantages of the present principles will become apparent from the following detailed description of exemplary embodiments, which is to be read in connection with the accompanying drawings.

BRIEF DESCRIPTION OF THE DRAWINGS

FIG. 4 illustrates an example quad-tree plus binary-tree coding tree unit representation.

FIG. 6 illustrates triple mode splitting of a block.

FIG. 14 illustrates an example of a ground truth of partitioning (left) and the corresponding scores represented per pixel (right).

FIG. 25 illustrates an example of asymmetric TOP split test.

DETAILED DESCRIPTION

An approach is described for improved entropy coding efficiency of transform coefficients in coding units, providing good compression and minimal increase in coder design complexity.

For clarity, in this description, "dividing", "segmenting" and "splitting" all mean the same thing, which is the act of performing a straight-line division of a block of pixels. Similarly, "splits", and "divisions" mean the same thing, a grouping of pixels as a result of dividing, splitting or segmenting a block or a sub-block.

In the HEVC video compression standard, a picture is divided into so-called Coding Tree Units (CTU), with typical sizes of 64×64, 128×128, or 256×256 pixels.

Figure 1:
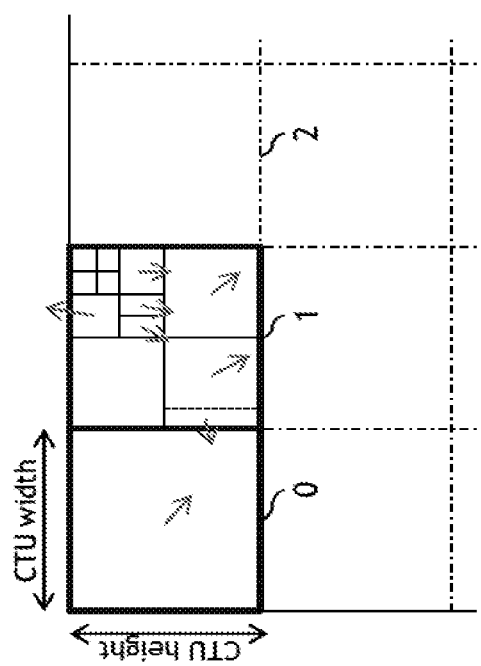
FIG. 1 illustrates one example of a coding tree unit and coding tree concepts to represent a compressed picture.

Each CTU is represented by a Coding Tree in the compressed domain. This is a quad-tree division of the CTU, where each leaf is called a Coding Unit (CU), see FIG. 1.

Figure 2:
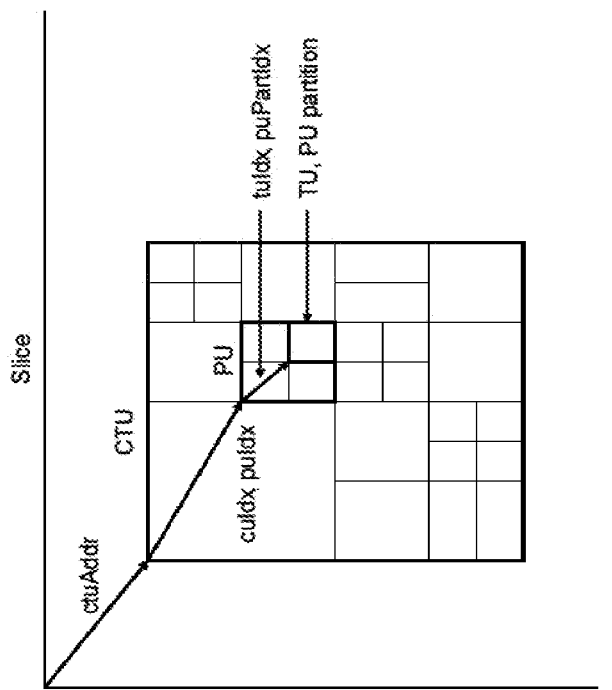
FIG. 2 illustrates an example of the division of a coding tree unit into coding units, prediction units and transform units.

Each CU is then given some intra or inter prediction parameters (Prediction info). To do so, it is spatially partitioned into one or more Prediction Units (PUs), each PU being assigned some prediction information. The Intra or Inter coding mode is assigned on the CU level, see FIG. 2.

Figure 3:
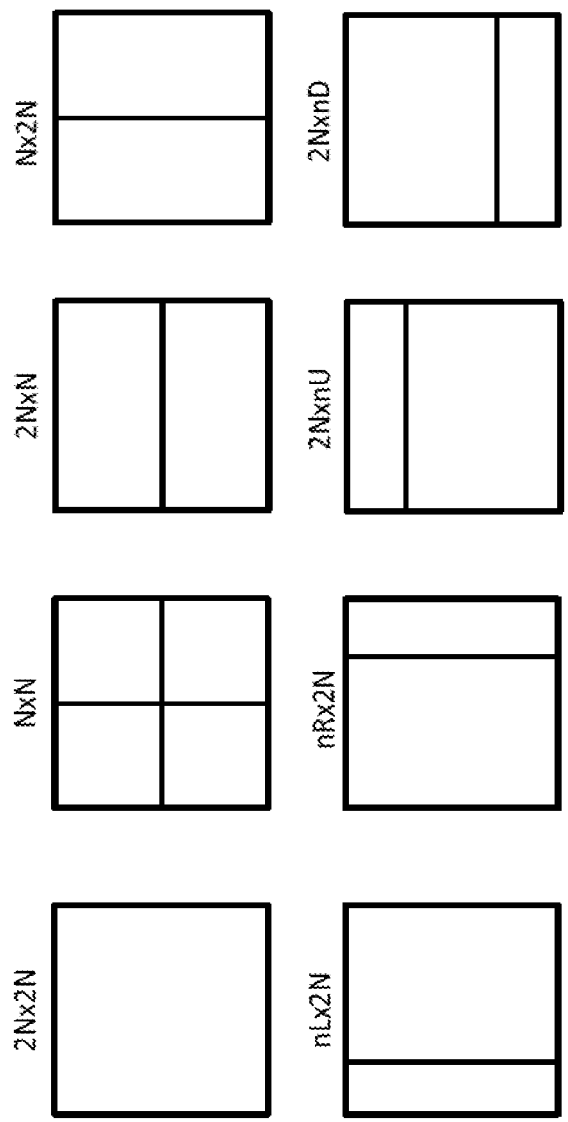
FIG. 3 illustrates an example of partitioning of coding units.
Figure 5:
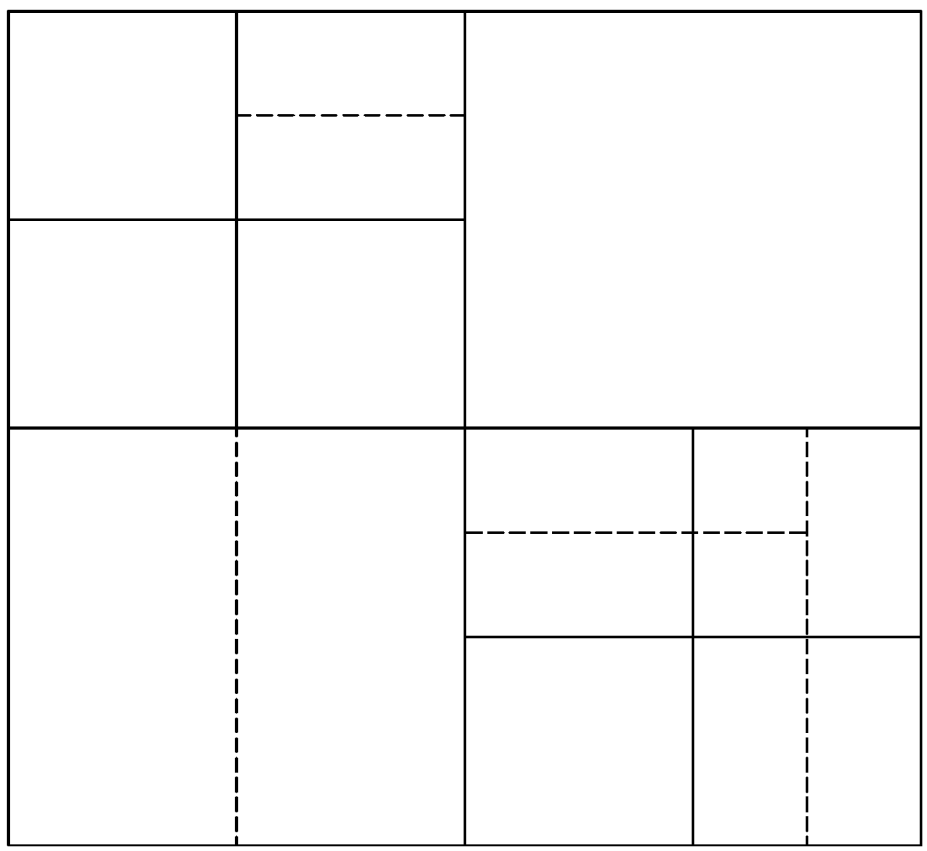
FIG. 5 illustrates one embodiment of a the Quad Tree plus Binary Tree representation on a coding block.

The Partitioning of a Coding Unit into Prediction Unit(s) Is done according to the partition type, signaled in the bit-stream. For Intra coding unit only the partition types 2N×2N and N×N, illustrated in FIG. 3 are used in HEVC. This means only square Prediction Units are used in Intra Coding Units.

On the contrary, inter Coding Units can use all partition types shown in FIG. 3.

According to the HEVC standard, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

New emerging video compression tools include a Coding Tree Unit representation in the compressed domain in order to represent picture data in a more flexible way in the compressed domain. The advantage of this flexible representation of the coding tree is that it provides increased compression efficiency compared to the CU/PU/TU arrangement of the HEVC standard.

The Quad-Tree plus Binary-Tree (QTBT) coding tool provides this increased flexibility. It consists in a coding tree where coding units can be split both in a quad-tree (4 sub-units) and in a binary-tree (2 sub-units) fashion. Such coding tree representation of a Coding Tree Unit is illustrated in FIG. 4.

The splitting of a coding unit is deckled on the encoder side through a rate distortion optimization procedure, which consists in determining the QTBT representation of the CTU with minimal rate distortion cost.

In the QTBT technology, a CU has either square or rectangular shape. The size of coding unit is usually a power of 2, and typically goes from 4 to 256.

In addition to this variety of rectangular shapes for a coding unit, this new CTU representation has the following different characteristics compared to HEVC.

First, the QTBT decomposition of a CTU is made of two stages: first the CTU is split in a quad-tree fashion, then each quad-tree leaf can be further divided in a binary fashion. This is illustrated on the right of FIG. 4 where solid lines represent the quad-tree decomposition phase and dashed lines represent the binary decomposition that is spatially embedded in the quad-tree leaves.

Next, in intra slices, the luma and chroma block partitioning structure is separated, and decided independently.

Further, no more CU partitioning into predictions units or transform units is employed. In other words, each Coding Unit is systematically made of a single prediction unit (previously 2N×2N prediction unit partition type) and single transform unit (no division into a transform tree).

The described embodiments concern the domain of picture coding unit representation in compression and aims at further improved compression efficiency.

Figure 7:
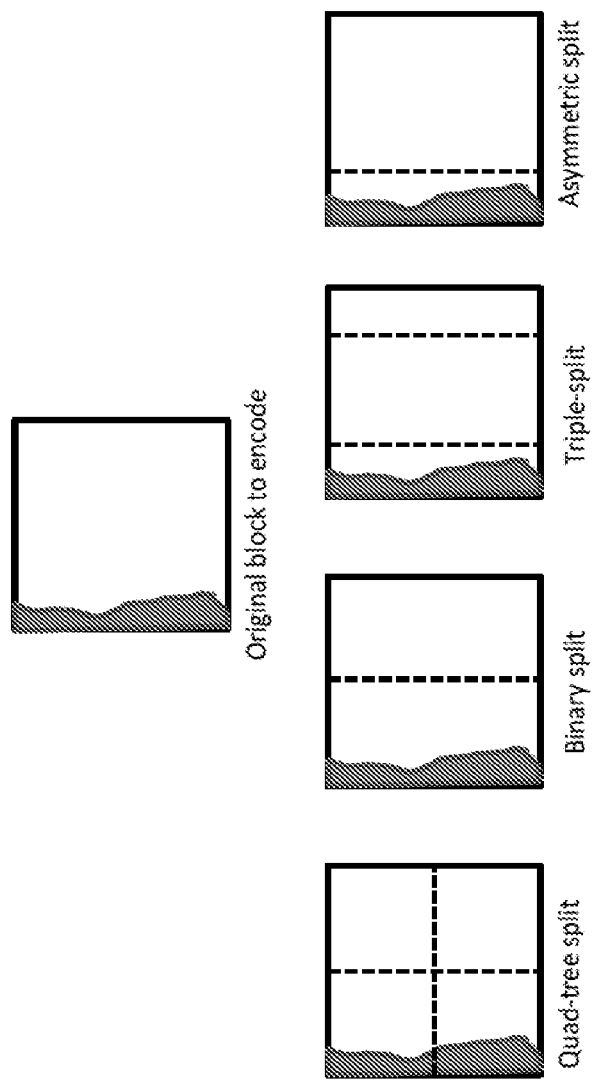
FIG. 7 illustrates different splits of a block to handle a block non-uniformity.

Triple trees, or triple splits, are splitting of a coding unit or sub-unit into three portions. One of the advantages is that all sub-blocks can be a power of 2. The main drawback is that it does not offer as much flexibility to optimally choose the partitioning of the block as it forces three sub-blocks, even if only two are necessary, for example, when the boundary of an object is passing close to the border (see FIG. 7, triple-split vs asymmetric split).

Figure 8:
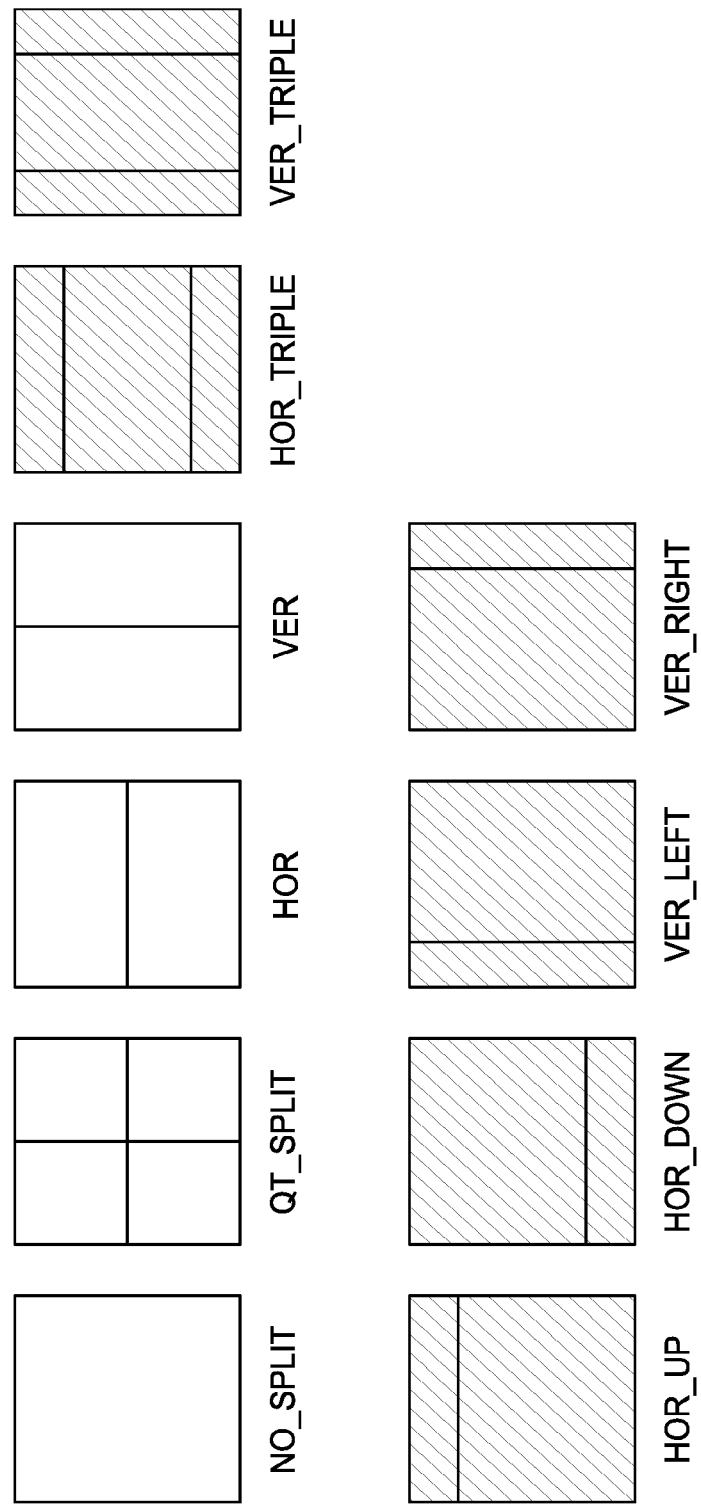
FIG. 8 illustrates the set of all Coding Unit spitting modes supported in the video coding scheme herein described.

A coding unit splitting mode, called the horizontal or vertical triple tree splitting mode, consists in dividing a coding unit (CU) into 3 sub-coding-units (sub-CUs), with respective sizes equal ¼, ½ and ¼ of the parent CU size in the direction of the considered spatial division. This is illustrated in FIG. 6. FIG. 8 shows the set of all Coding Unit spitting modes supported in the video coding scheme herein described.

The problem addressed by at least one of the described embodiments is how to improve and/or accelerate the Rate Distortion Optimization (RDO) that is performed at an encoder, which corresponds to the decisions made by the encoder to select the best tools of a standard to compress a given block, macroblock or Coding Tree Unit (CTU). Instead of checking the bitrate/distortion at each block level to find the optimal partitions, a CNN (Convolutional Neural Network) network, for example, provides a probability score of each type of possible split into smaller blocks. The computation of this score is very fast since it can be highly parallelizable and can be less complex than a classical RDO operation. This is one exemplary solution, but the described embodiments can receive any splitting score as input.

These embodiments are incorporated within the framework of compression of video, specifically at the encoding stage where decisions are made to partition the images of a given input video sequence into blocks. Since H.264/MPEG4-AVC, hybrid codecs have partitioned the images into blocks of different sizes to adapt their compression tools to the textures and objects. In H.265/HEVC for example, the images are first divided into 64×64 non-overlapping Coding Tree Units (CTU), which are then potentially split into smaller Coding Units (CU) down to 8×8 pixels. Although the standards only specify the syntax that signals the sizes of these CU, encoders require an efficient way to choose and optimize the sizes over the images, depending on its ability to compress the different regions. This process is included into the so-called Rate-Distortion Optimization (RDO) that aims at finding the best compromise between a target quality of a reconstructed region and the required bits to be transmitted. Basically, if a CTU contains a signal which is well predicted and reconstructed, there is no need to split it into small blocks, which would result in more syntax. However, when a highly detailed texture is difficult to encode and results in residuals with a high energy, it is relevant to split into small blocks since the price of the syntax is worthwhile compared to the cost reduction of residuals. A full RDO would then consist in evaluating every possible block partitioning of a CTU, which is of huge complexity. A reference software encoder uses a subset of the full RDO, considers only a fixed causal part in the CTU and adds some heuristics but the combinatory remains very high.

Classical encoders perform a depth-first tree search recursive process, to decide the coding tree associated to a CTU. At each depth level, the Coding Unit split mode (among no split, quad-tree block division, binary block division, or another split) that gives lowest rate distortion cost is selected.

In the described embodiments, a set, or table, of probabilities of splits, computed from texture analysis of pixels in and around a block of image data, is used to predict when to split a given block into smaller blocks.

To perform RDO with an acceptable complexity, several methods have been implemented in existing codecs.

First, split the search into two passes: a first pass performs almost all the prediction modes and splitting options but evaluates the energy of the potential residual with a fast method. Then, the partitioning is fixed, and the second pass precisely evaluates the cost of a subset of best selected modes, transforms or other tools.

In addition, heuristics can be used to avoid a fully exhaustive search over all possible combinations of CU partition, coding mode, prediction mode, and transform index. As an example, the spatial division of a given CU into several sub-CU will not be evaluated in case the parent CU and/or the evaluation of a first spatial division mode led to a quantized residual equal to zero (for example, skip mode or CBF flag equal to 0).

Heuristics can be used to avoid less probable partitions, for example by considering the partitioning of previously coded neighboring regions.

The proposed method herein enables much faster selections of partitions while keeping as much coding efficiency as possible.

A prior fast-encoding method involving CNN-based methods for RDO speedup has several limitations. In this method, a convolutional network is used to make decisions on whether to split a given block, within the framework of HEVC.

However, the output of the CNN is a duplet of values that give information on the probabilities of whether to split a current block into 4 smaller quadtree blocks. The embodiments described herein enable the consideration of multiple types of splits: for example, quadtree, binary tree as detailed later.

And, all blocks from 8×8 to 32×32 are first sampled to an 8×8 matrix by averaging, providing an 8×8 matrix as input to the CNN. Although this clearly shows an advantage in terms of implementation. i.e. a unique CNN for all block sizes, it reduces the performances in terms of efficiency to distinguish borders at each level of the partition tree.

One idea of the proposed embodiments is use a texture-based prediction of splits to improve the Rate Distortion Optimization at the encoder side of existing and future codecs. Specifically, this technique allows a system to compute better decisions of partitioning the images in terms of accuracy and speed.

Figure 9:
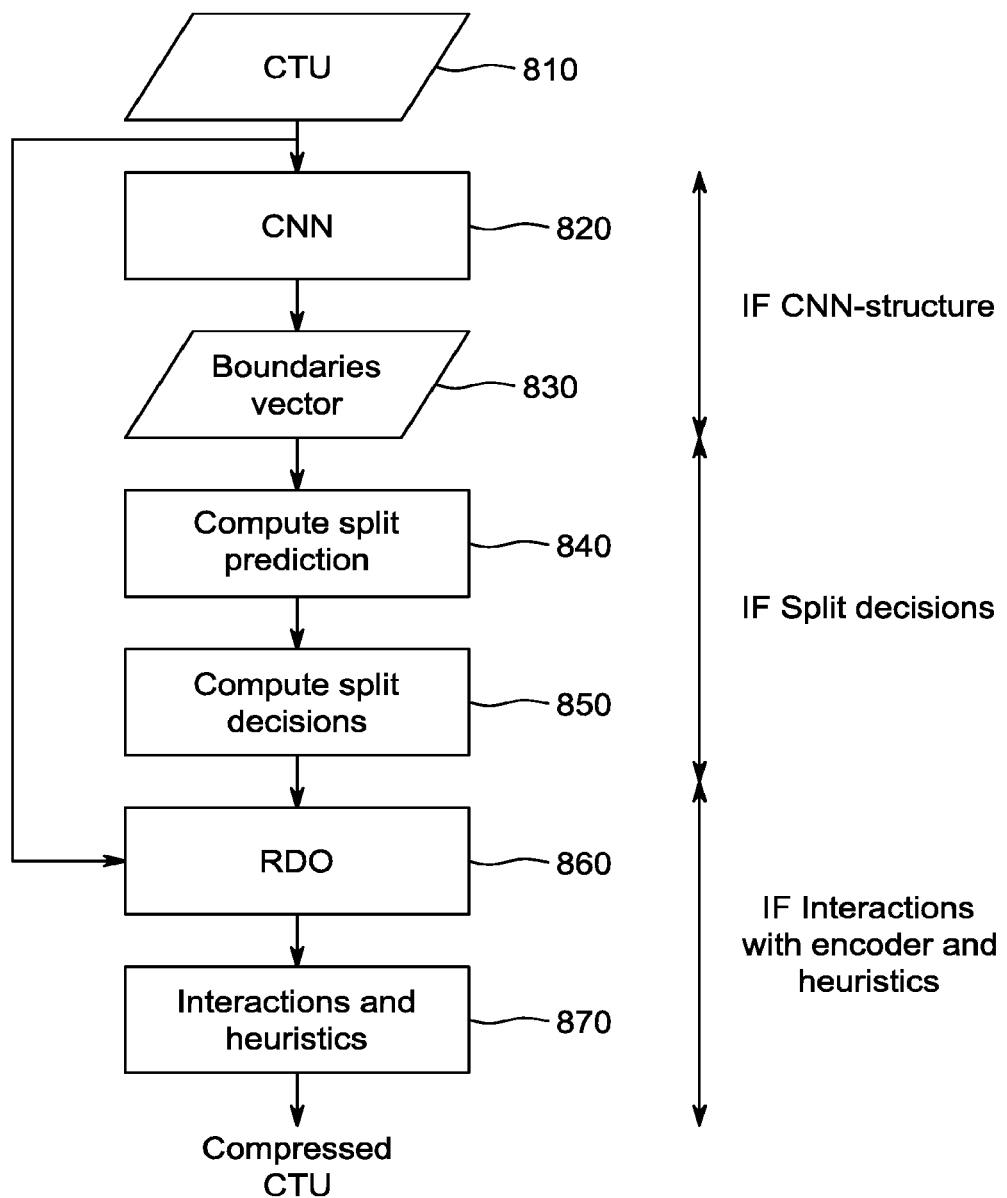
FIG. 9 illustrates an example embodiment of the overall encoding of a Coding Tree Unit (CTU) with deep-learning-based split decisions.

The embodiments described are part of a framework shown in FIG. 9. FIG. 9 presents the overall processing at encoder side. Additional inventions handle the CNN (820) structure itself and the interactions with the encoder and heuristics (870).

The described embodiments focus on ways to use the output vector of the CNN to make decisions about which type of split to be considered by the RDO for each block, without considering heuristics and speed-ups that already exist in an encoder.

It takes as input a vector of boundary probabilities (830), and outputs a decision (true; false) for each split type to be considered by the rate distortion optimization (RDO) (860).

Please also note that for the described embodiments, examples are given with the output of a CNN, but the split prediction and decision scheme can be performed using any boundary prediction (texture/object analysis) method.

Figure 10:
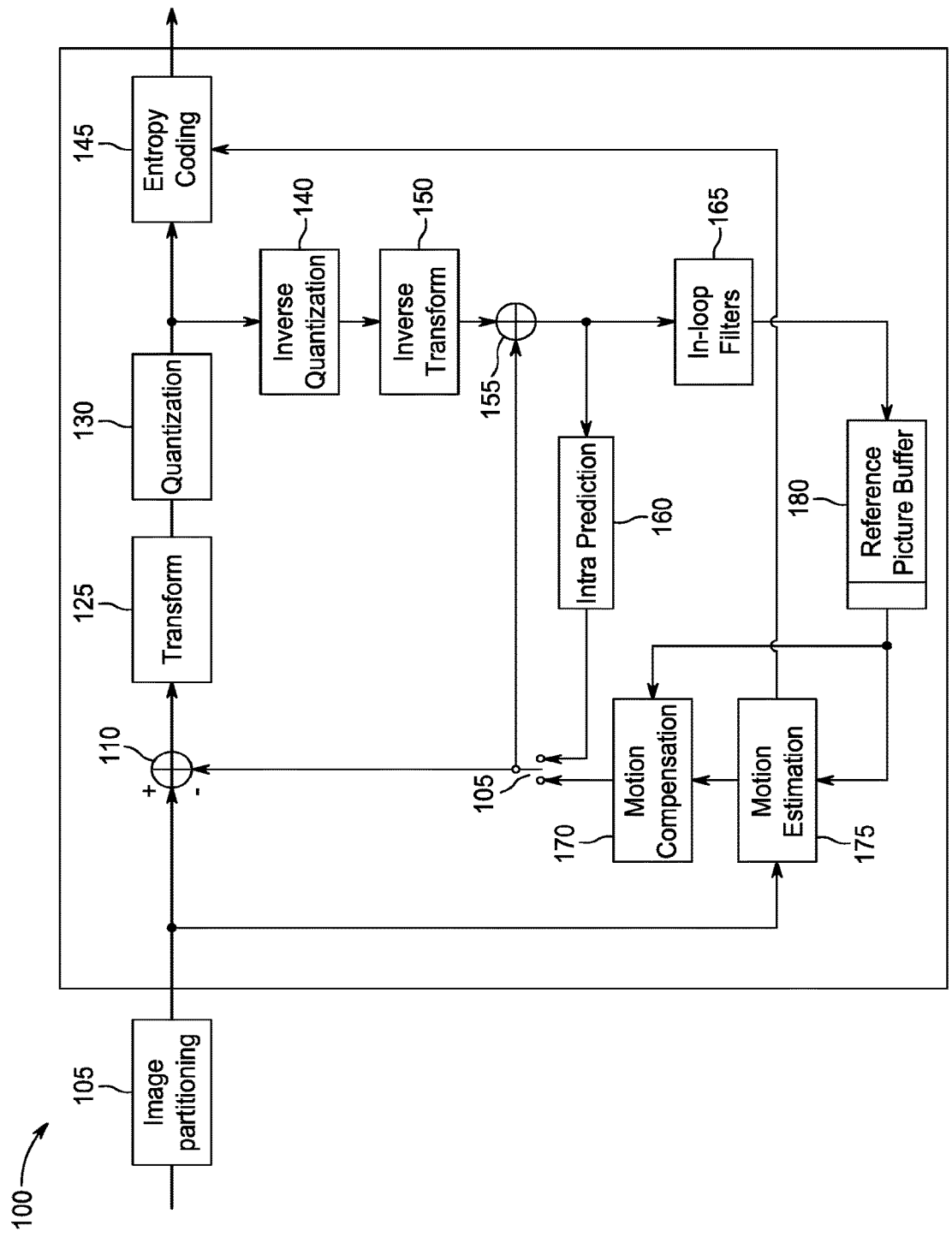
FIG. 10 illustrates one embodiment of a standard, generic, video compression scheme.

The embodiments described aim at piloting the encoder decisions, and therefore are applicable to encoders and improving the encoding decisions. They are related to step 105 of FIG. 10. They enable partitioning of the Coding Tree Units while avoiding exhaustively computing the Rate and the Distortion of all candidates block partitions, which implies applying all steps for each candidate block partition.

The description of the present solution is based on an exemplary version of the reference software designed by the joint Video Exploration Team (JVET) to design the next MPEG/ITU standard for video coding, currently known as H.266.

In this framework, the images are divided into non-overlapping Coding Tree Units (CTUs), like in HEVC. CTUs then correspond to the biggest blocks that can be considered for encoding a given region. In the current version, CTUs' are of size 256×256 pixels.

Then, when the texture is difficult to predict and encode on the entire CTU's surface, smaller blocks are considered. This allows choosing different prediction/transform/coding tools per blocks that adapt to the textures. This is at the price of transmitting more syntax elements to describe those choices and block shapes. Hence, Rate Distortion Optimization is performed to select the best modes and the best partition with respect to a given quality and/or bitrate target. There is a balance that needs to be found between the cost of residuals after prediction and transform and the cost of syntax elements that describe the encoding tools. The bigger the blocks on detailed areas, the more energy of the residuals. On the other hand, the smaller the blocks, the costlier the syntax elements.

In HEVC, the structure of block partitions follows a quadtree. So, for each tree depth, the encoder can decide whether to encode directly the current block or split it into four sub-blocks. This is typically done by evaluating the cost of encoding the block at its current size and comparing it to the sum of the 4 costs of the sub-blocks. If, for a given quality, it costs less bits to transmit the syntax for smaller blocks, the encoder proceeds to the evaluation of the next level of depth in the coding tree. This requires trying out the different prediction modes and transforms and other tools of the standard for all the block sizes until the encoder reaches a block size that minimizes the cost, hence the high complexity of encoders compared to decoders.

Coding a considered CTU as a 256×256 block is compared with the coding of that CTU, spatially divided into two or more smaller blocks. To do so, a depth-first recursive rate distortion optimization process takes place. It leads to the representation of the CTU under the form of a so-called coding tree. A typical coding tree obtained with the reference model is illustrated on FIG. 4.

The coding tree's leaves correspond to CUs (Coding Units, also named blocks in this document) which are not divided into smaller CUs. They are coded through prediction, residual transform, quantization and entropy coding. The overall rate distortion optimization includes the RD optimal choice of the coding parameters associated to a non-split CU.

Moreover, each node of the coding tree represents a potential CU which is spatially divided into smaller sub-CUs, according to a given split mode. The split mode that leads to the smallest rate distortion cost among all split mode candidates is chosen. Some syntax elements indicate the split mode leading to each of the corresponding CU. The bits used to signal the split mode of each CU are considered when computing the rate cost, during the overall rate distortion minimization procedure.

With regard to HEVC, two split modes are possible for a given CU: no split, or quad-tree split.

In the case of H.266 encoders, the complexity is even bigger for multiple reasons:
Block sizes range up to 256×256
Different block shapes are considered: square and rectangle blocks
More prediction tools
More transforms The following paragraphs describe an exemplary CNN-based structure to describe the type of input the described embodiments use.

Figure 11:
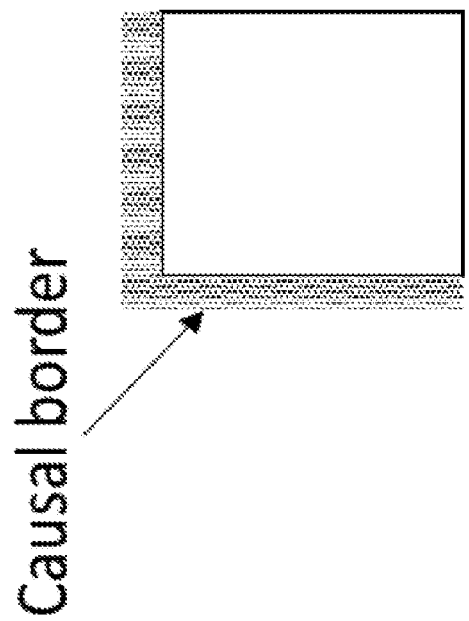
FIG. 11 shows an example of pixels input to a Convolutional Neural Network (CNN).

Contrary to a prior solution, the input of the CNN is a block or patch of pixels that correspond to the whole CTU plus the causal L-shape of pixels neighboring the CTU, as depicted in FIG. 11. For example, with a CTU of size 64×64, the input patches are then of size (64+N)×(64+N) where N is the size of the causal border. In practice, we choose N=1. The reason to add the border is that the coder itself uses this causal boundary to perform the prediction of the block.

In a first embodiment, the causal border is coming from the original frame. In this case, one advantage is that the CNN processing of each CTU can be done in parallel since it only uses the original frame.

In a second embodiment, the causal border is coming from the decoded neighbors. In this case, one advantage is that the CNN is using the same input as the encoder for the prediction, hence more accurate. However, in this embodiment the processing of each CTU cannot be done in parallel since it uses the decoded frame.

In HEVC or H266, the splits of the Top and Left neighbors have some influence on the coding cost of the splits of the current CTU. For example, in HEVC, the splits flag at each level of the tree are based on a contextual entropy coding depending on the split depth of the neighbors.

Figure 12:
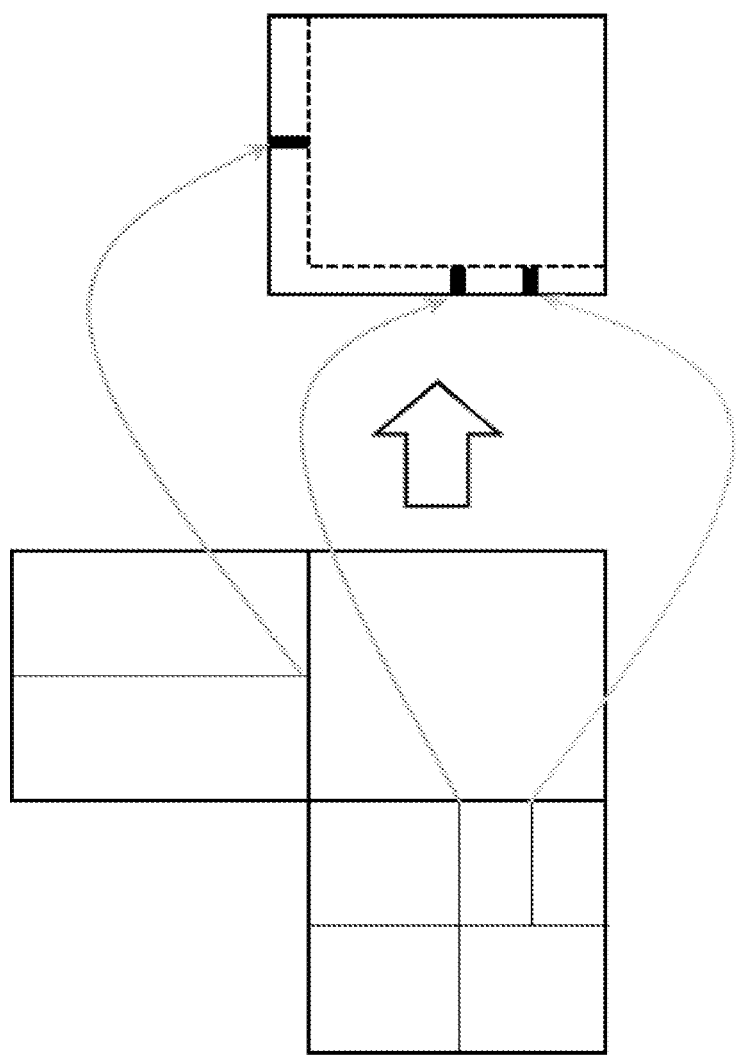
FIG. 12 illustrates boundary information as a secondary input channel to a CNN.

To account for this information in the CNN, a secondary channel (the primary channel of the input being the texture and causal border) can be added. FIG. 12 shows one example of using boundary information as a secondary input channel.

Figure 13:
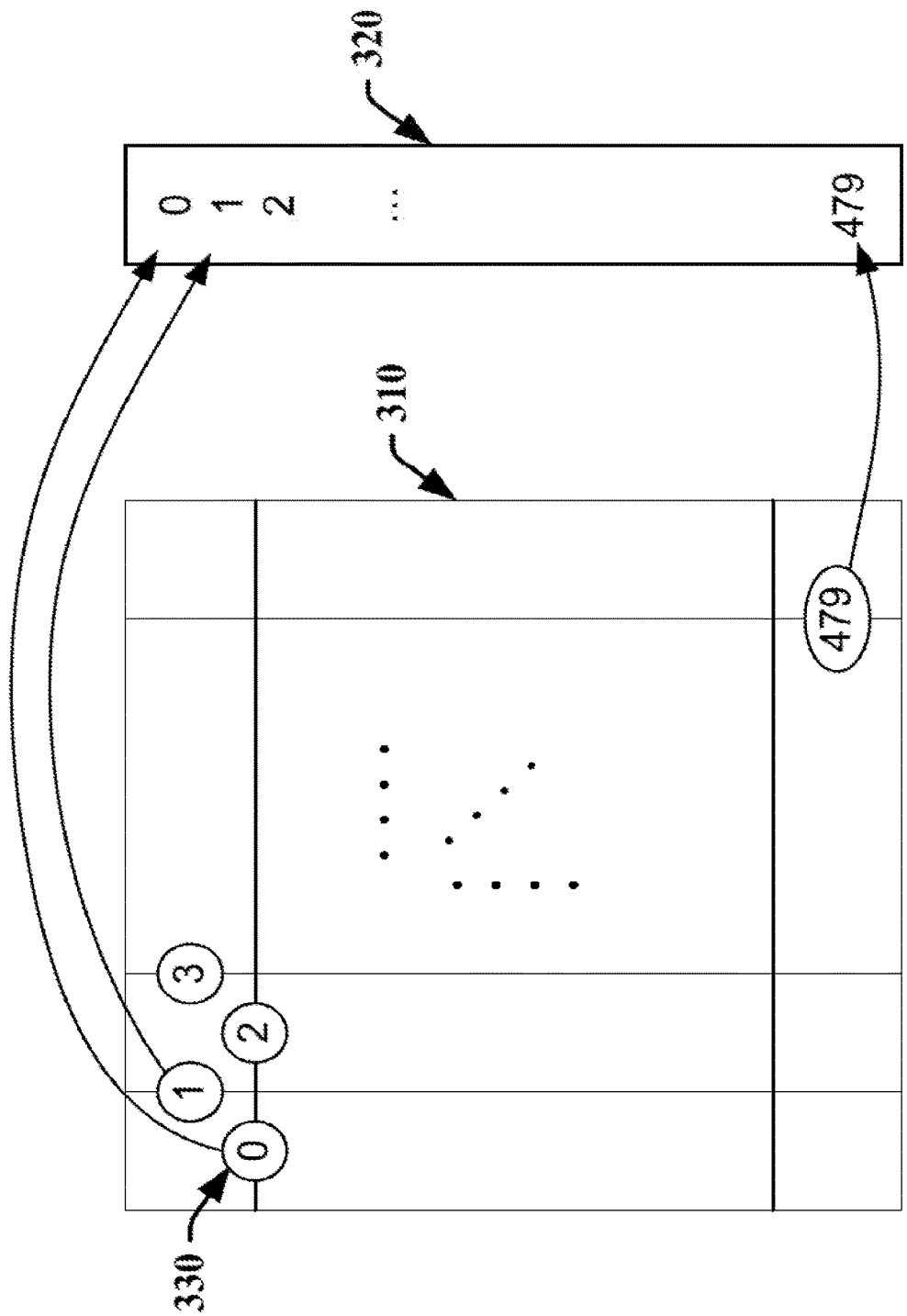
FIG. 13 illustrates an example of a resulting vector of boundaries.

The output of the CNN corresponds to a vector in which each value represents one possible border within a given CTU. In H.266, the minimal block size being 4×4, only pixel borders on a 4×4 grid can be considered for block splits. Hence, for each potential border, the CNN outputs a probability for it to correspond to an actual border between two blocks. For instance, with a CTU size of 64×64, a vector of size 480×1 is considered. FIG. 13 depicts an exemplary mapping between potential 4 pixel-long borders in a CTU (310) and their corresponding value in the output vector (320). Each boundary, for example, boundary #0 (330), is assigned an index which can be in a predefined order. In the example shown, the CTU is of size 64×64, which results in a vector of 480 values. Evaluating the different border probabilities at each tree-depth, i.e. block size and shape, will help in deciding whether to split the block, and in the case of deciding to split, which splits should be performed.

The described embodiments take the vector of boundary probabilities as input. In this example, the vector is computed using a CNN structure. The following embodiments can, however, take any information giving a probability of split at each possible splitting location.

At each tree depth, the encoder needs to decide to split, and which type of split, or not to split.

As a reminder, this part of the framework described in FIG. 9 consists in two steps 840 and 850 depicted in FIG. 9. It takes as input a vector of boundary probabilities 830, and outputs a decision (true: false) for each split type to be considered by the rate distortion optimization (RDO) 860.

FIG. 14 shows an exemplary ground truth partitioning on the left, which is the result of an encoding with an H.266 candidate encoder, as well at the corresponding probabilities depicted by gray levels. The whiter the edge, the higher the probability to get a split at each location. Please note that this corresponds to a representation that maps the probability from the vector to the corresponding boundary locations in the CTU.

Figure 15:
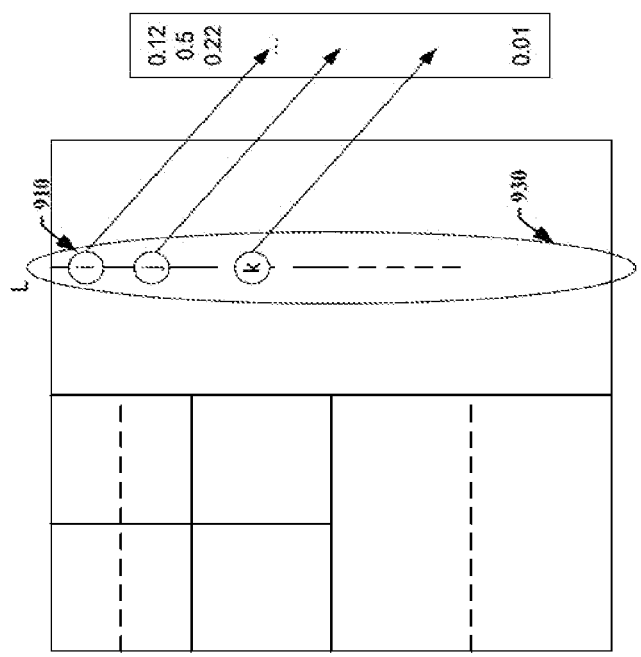
FIG. 15 illustrates an exemplary split location L with corresponding boundary probabilities i, j, k . . . .

To get a probability of boundary, it is proposed to consider all the boundary locations involved in each split. FIG. 15 depicts an exemplary CTU in which we consider a split along L, and the corresponding indices in the vector that will be considered for computing the probability of split.

The probability then corresponds to $$p(L) = \frac{1}{\text{card }(L)} \sum_{i \in L} V(i) \qquad \text{(eq p1)}$$

Where L represent the total boundary for a given split, V the vector of probabilities. Please note that L can consist in a "cross".

Figure 21:
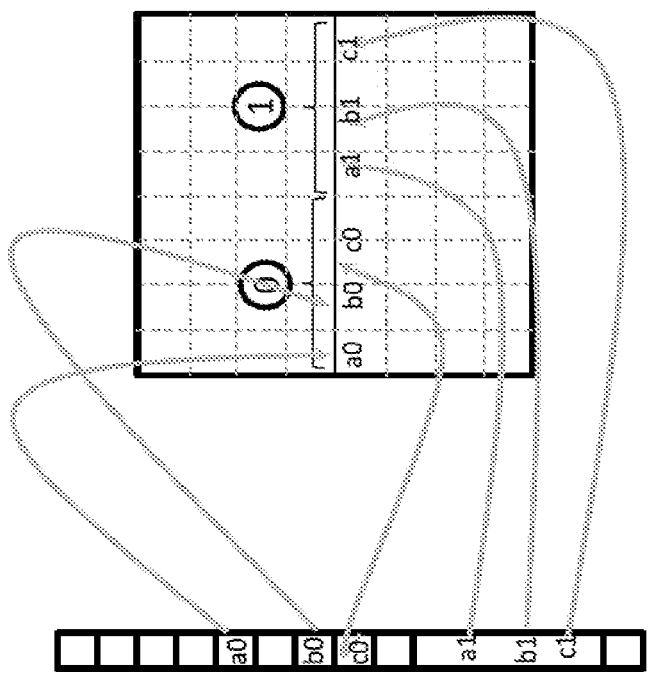
FIG. 21 illustrates a vector of probabilities, each side of a horizontal boundary averaged separately.

The described embodiments propose to distinguish between three main options:
Is Boundary: the probability is high enough to predict a boundary
No Boundary: the probability that this boundary does not exist is high enough not to consider it.
Undetermined: probabilities do not allow to conclude.
In another embodiment, the split probabilities are computed more conservatively. In the above equation, the probability of a split is the average probability of a given boundary. However, to be more conservative, we can redefined the probability as the minimum of the average for each side of the boundary. For example, in FIG. 21, from the vector of probabilities, each side of the horizontal boundary (0 and 1 in the figure) are averaged separately: $L_0=(a0+b0+c0)/3$ and $L_1=(a1+b1+c1)3$. The probability of having the horizontal boundary is then $$p(L)=\min(p(L_0),p(L_1)) \qquad \text{(eq p2)}$$

With this method, it ensure that a binary split is really needed (and not only a half split from another vertical then horizontal split combination). Especially, for quadtree, the probability of each boundary (horizontal and vertical) are redefined this way.

For a given split, p(L) is considered and produces a spit prediction for each type of split, which can be expressed as:

splitPred[s]∈ {false,undefined,true},s∈ {NO_SPLIT, QT_SPLIT,HOR,VER} in the exemplary case of JEM.

Hence, two thresholds for p(L) are required for each type of split: one for the decision of split $Th_S$ and one for the decision of "no split" $Th_{NS}$. If none of those conditions are met, the boundary prediction remains undefined and classical RDO is performed.

Figure 16:
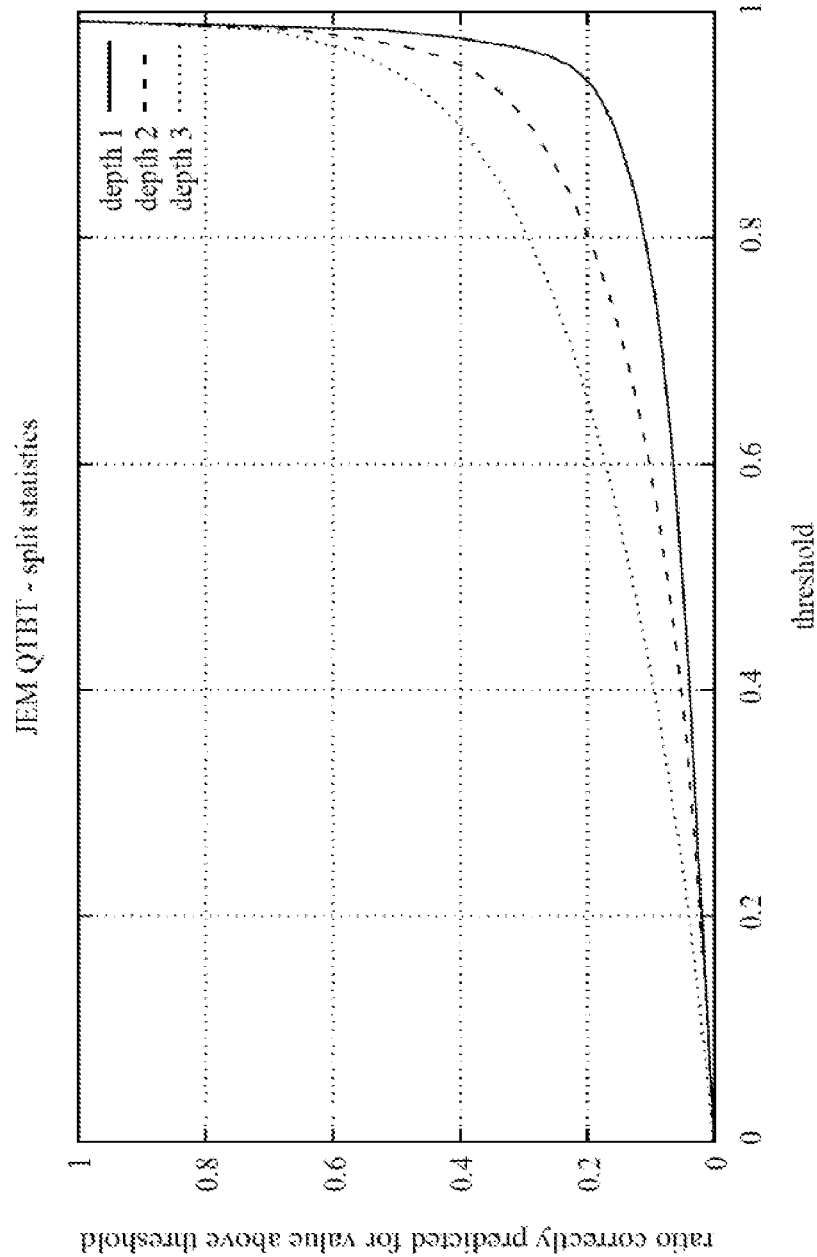
FIG. 16 illustrates a graph of exemplary probabilities of quadtree splits at distinct levels in the tree, averaged on a large testset of 19336 65×65 patches at QP=32 with JEM (quad tree/binary tree).
Figure 17:
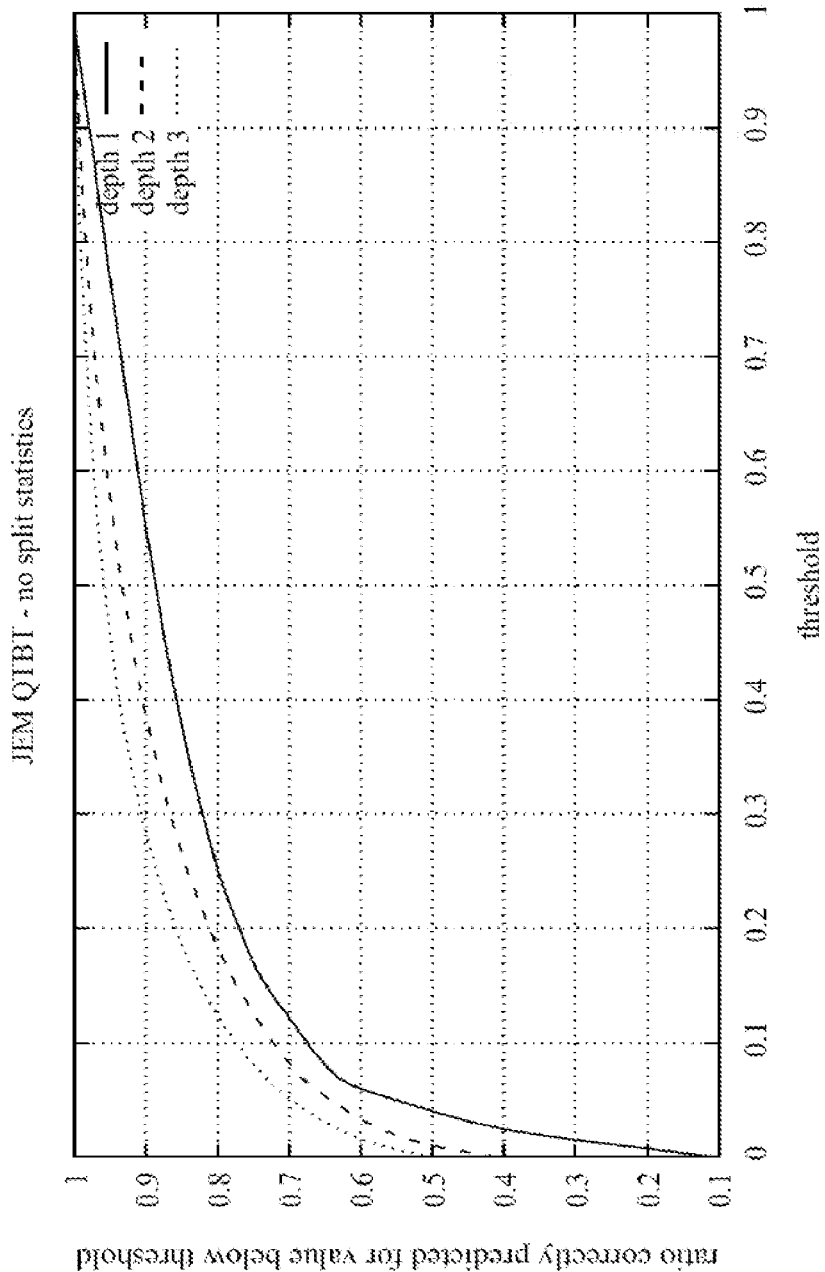
FIG. 17 illustrates exemplary probabilities of no split at distinct levels in the tree, averaged on a large testset of 19336 65×65 patches at QP=32 with JEM (quadtree/binary tree).

To better understand the relations between probabilities and thresholds. FIG. 16 shows on the y-axis the proportion of correct boundaries depending on where the "boundary presence" threshold $Th_S$ (x-axis) is set for 3 distinct levels in the partition tree. FIG. 17 shows the corresponding "boundary absence/no split" statistics w.r.t $Th_{NS}$.

As the considered boundaries are the horizontal and the vertical middle boundaries in JEM (quadtree/binary tree), these figures show the average ratio of these two boundaries.

For example, with a split threshold of 0.8 on the probability p at depth 1, approximately 90% of the samples are above and then well predicted. With a no-split" threshold of 0.3 at depth 1, approximately 80% of the samples are well predicted.

The boundary decisions step (850 in FIG. 9) takes as input the boundary predictions detailed in the previous section. Depending on the coder constraint, it outputs a split decision for each type of split to be performed by the RDO: true or false.

In the case of HEVC, a quadtree drives the partitioning and the only possibility of split at each level corresponds to the division into 4 equal area square blocks.

For evaluating the probability of split, the proposed method then considers all the indices of the vector that form the "cross" which divide the CU into 4.

Figure 18:
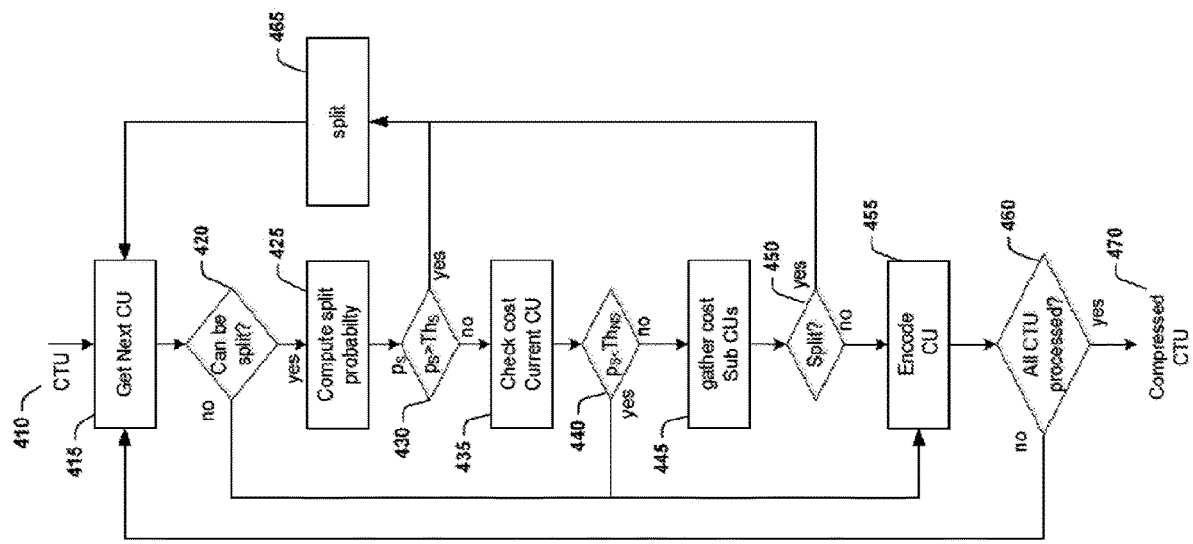
FIG. 18 illustrates an exemplary embodiment of a flowchart of compress CTU, including CNN-based decisions.

FIG. 18 depicts the entire process of compressing a CTU at the encoder side, in the exemplary case of HEVC. In this simple example, only one type of split is considered.

It takes a CTU (410) as input and outputs compressed data (460). First, a function 415 returning the next CU is called, which returns the parameters of the current CU to process. At the first call, if the entire CTU can be coded as a CU, it returns a CU with at the dimensions of the CTU. In the exemplary case of HEVC, in an intra coded image, the largest CUs are 32×32, then the first CU to process is the top left 32×32 block in the 64×64 CTU. This function should also consider the cases at image borders.

A first step (420) consists in evaluating if the CU can be split or not. For example, a CU of minimum size cannot be further split.

The split probability computation (425), described above in the description of the boundary prediction (step 840 in FIG. 9) takes the current CU as input and outputs a score $p_s$ denoting the probability of split. In the exemplary case of HEVC, the only possible type of split corresponds to quadtree splits.

If $p_s$ is superior to a predefined threshold for splitting decision $Th_S$, the CU is automatically split by module 465 without checking its cost (430). If not, its cost its checked by module 445.

In this case, $p_s$ is compared to another threshold $Th_{NS}$ to decide if it is directly coded without checking the possibility of splitting. If $p_s<Th_{NS}$, the CU is not split and encoded directly by module 450.

If $Th_{NS}<p_s<Th_S$ the cost of the sub CUs are gathered to be compared with the current CU's cost as it is classically done in classical encoders. A decision (450) is made and the CU is either encoded by 455 or split by 465 and the next CU is processed.

One can notice that when $p_s > Th_S$, no RD cost check is required at the current level, which is a gain of time at the encoder. Same goes when $p_{s>}$, $Th_{NS}$ which spares the check of sub-CUs, hence the speed-up of the approach compared to the classical RDO.

When all the CUs of the current CTU are encoded, the compressed data are output (470).

The following paragraphs describe some of the practical options depending on the codec frameworks.

In the case of future video coding, several types of splits can occur. In the case of the reference software JEM, designed by the JVET, a hybrid structure combining quadtree and binary tree has been adopted.

For each CU, 3 types of split can occur:
Quad: four square sub-blocks
Binary horizontal: 2 equal surface blocks with a horizontal boundary. They can be squares or rectangles depending on the parent's shape.
Binary Vertical: 2 equal surface blocks with a vertical boundary. They can be squares or rectangles depending on the parent's shape.

Table 1 details the proposed policy for split possibilities in JEM, depending on boundary predictions $p_s$ (or $p(L)$) which is compared to the threshold for split $Th_S$ and the threshold for no-split $Th_{NS}$. In JEM, quad tree split and binary splits vertical and horizontal are considered. At the top of the tree, quadtree split can be chosen. As soon as binary split is chosen, no quadtree splits can be performed at next levels. This table considers this constraint of the codec through the third column. The possible choices of split can be different for the same $p_s$ when quadtree split is available or not. The last column provide the output of the system described in this patent, that is, for each split type {NS (No split), V (vertical), H (horizontal), Q(quadtree)}, a Boolean {true, false} for Rate-distortion optimization check.

At the end of the process described in these embodiments, the RDO gets as input a set, or table, of Booleans informing on whether to include or not each type of split in rate distortion checks.

(right)), computed using eq p2. The value $S_x$ refers to the probability computed using eq p1.

Figure 22:
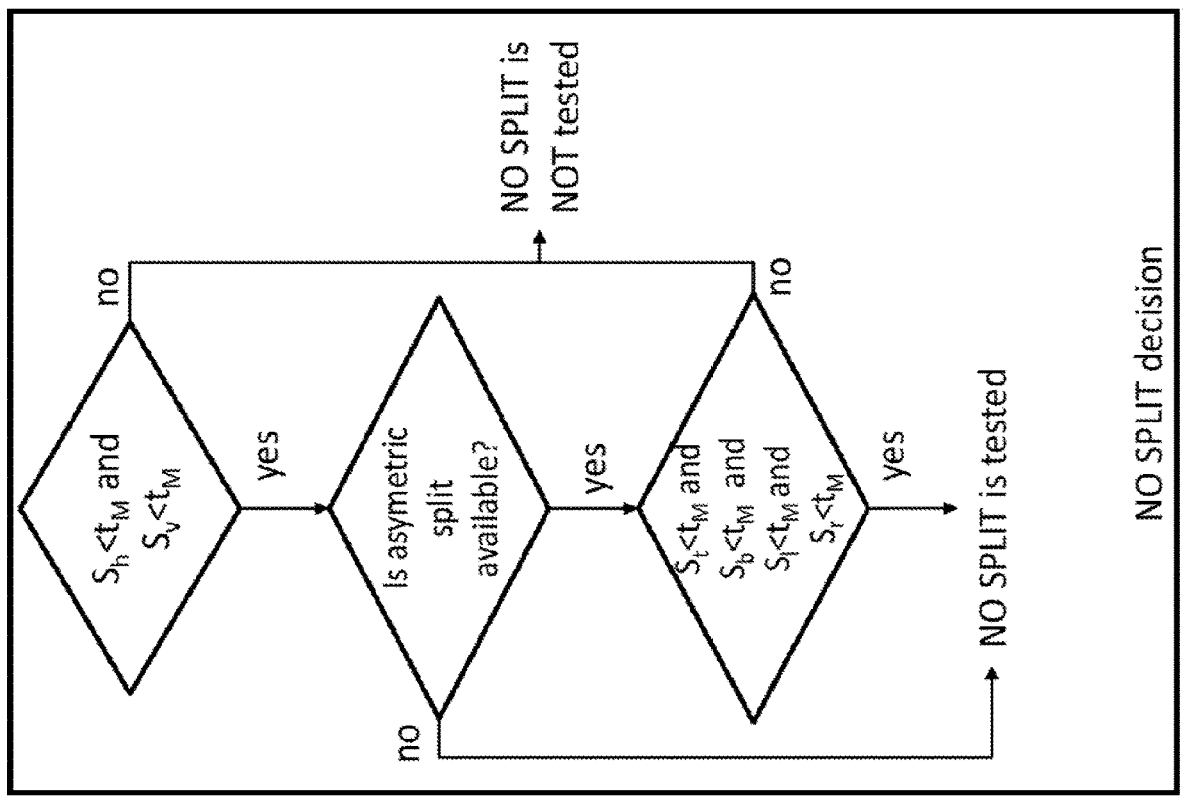
FIG. 22 illustrates the decision diagram for the NOSPLIT decision.
Figure 23:
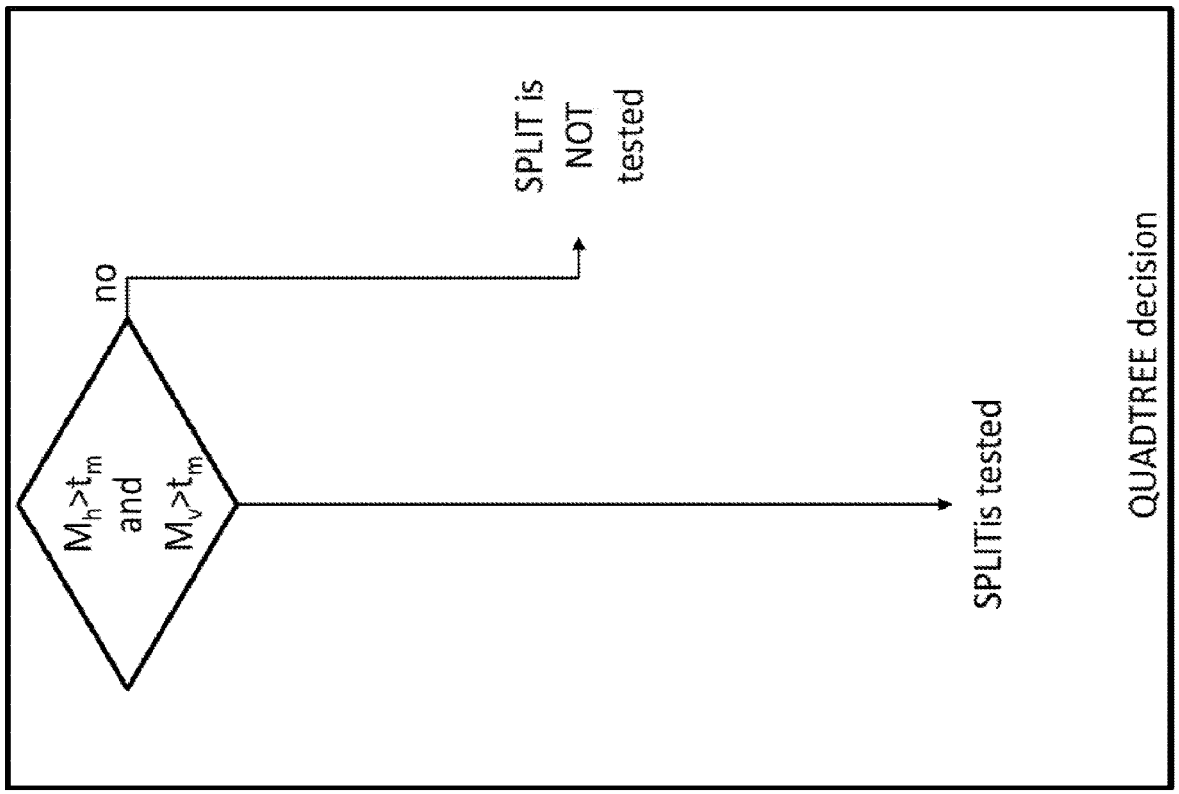
FIG. 23 illustrates a QUADTREE split is tested when both vertical and horizontal boundaries are not absent.

In FIG. 22, the decision diagram for the NOSPLIT decision. The NOSPLIT is tested when both vertical and horizontal boundaries are absent. Furthermore, if asymmetric splits are available, absence of the 4 splits (horizontal top, horizontal bottom, vertical left and vertical right) is also tested. In FIG. 23, the QUADTREE split is tested when both vertical and horizontal boundaries are not absent. Note that the absence/presence of a boundary is computed using eq p2 which is the conservative probability of boundary, using the minimum probability of each side of the boundary.

Figure 24:
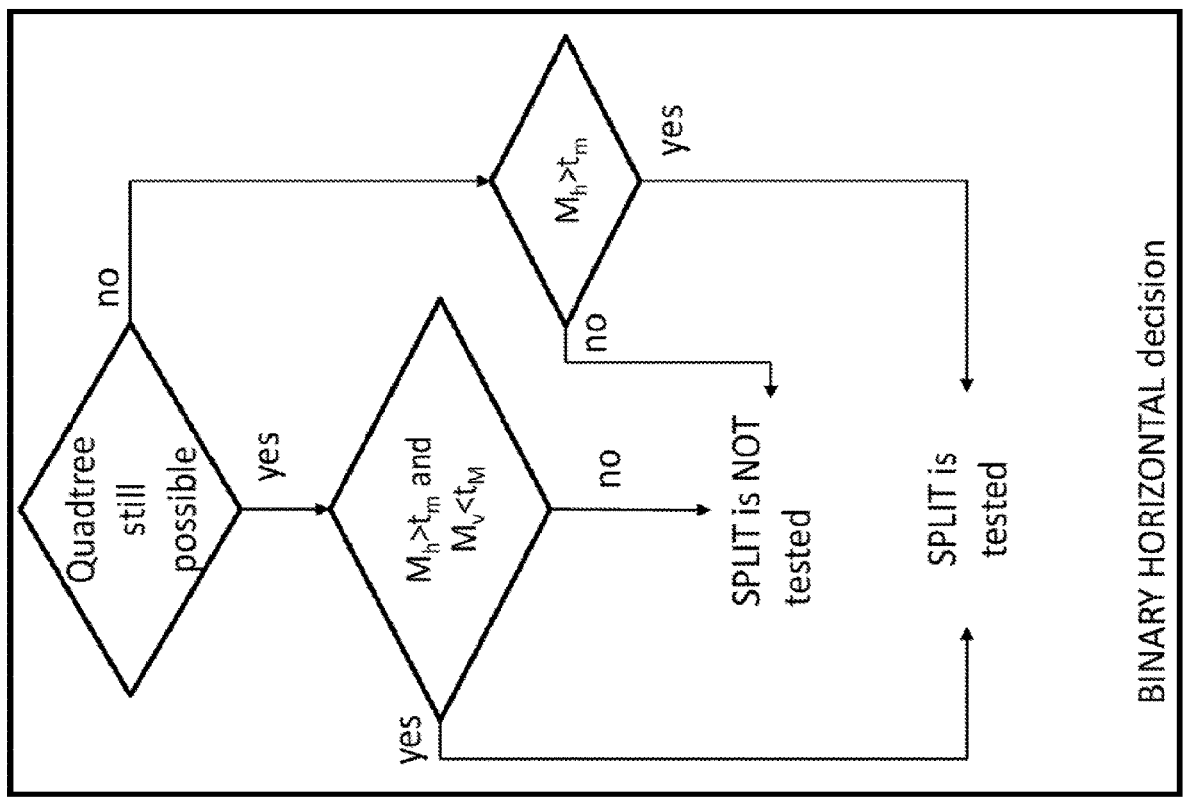
FIG. 24 illustrates an example of BINARY HORIZONTAL split is tested

In FIG. 24, an example of BINARY HORIZONTAL split is tested (the same logic can be applied for BINARY VERTICAL, by swapping h and v). If a quadtree is possible at this level of topology, the split is tested only if it is not possibly a QUADTREE split, otherwise, the split is tested if an horizontal boundary is not absent.

In FIG. 25, an example of asymmetric TOP split is tested (the same logic apply to horizontal bottom, vertical let or vertical right). The split is tested if the top boundary is not absent.

Other codec candidates for H.266 propose adding other types of split, namely asymmetric binary tree and triple tree. Asymmetric binary tree offers the possibility to split a block, square or rectangle, into 2 sub-blocks with different surfaces. The split can be vertical or horizontal. Sub-block sizes shall comply with transform sizes, that is usually ¼ and ¾ of the parent's block size. Triple tree splits a block into 3 sub-blocks. The split can be vertical or horizontal. Sub-block sizes shall also comply with transform sizes, that is usually ¼, ½ A and ¼ of the parent's block size. As with JEM, the proposed embodiments can be adapted to consider the split types and output decisions for each of them. FIG. 8 shows the type of splits considered by the described embodiments.

So far, the split predictions and decisions for each level of the tree have been detailed. This section presents how to manage the processing of the whole tree. If we take the example of JEM in intra, 5 levels are considered.

Thresholds can then be set depending on:
levels in the tree

TABLE 1 split policy in JEM, depending on the boundary prediction, thresholds and the type of available splits

| Horizontal | Vertical | Is Quadtree possible | Possible choice |
|---|---|---|---|
| $p_s <= Th_{NS}$ | $p_s <= Th_{NS}$ | both | NS (No Split) |
| $p_s <= Th_{NS}$ | $Th_{NS} <= p_s < Th_S$ | both | V + NS |
| $p_s <= Th_{NS}$ | $p_s > Th_S$ | both | V |
| $Th_{NS} <= p_s < Th_S$ | $p_s <= Th_S$ | both | H + NS |
| $Th_{NS} <= p_s < Th_S$ | $Th_{NS} <= p_s < Th_S$ | both | V + H + Q + NS |
| $Th_{NS} <= p_s < Th_S$ | $p_s > Th_S$ | yes | V + Q |
| $Th_{NS} <= p_s < Th_S$ | $p_s > Th_S$ | no | H + V |
| $p_s > Th_S$ | $p_s <= Th_S$ | both | H |
| $p_s > Th_S$ | $Th_{NS} <= p_s < Th_S$ | yes | H + Q |
| $p_s > Th_S$ | $Th_{NS} <= p_s < Th_S$ | no | H + V |
| $p_s > Th_S$ | $p_s > Th_S$ | yes | Q |
| $p_s > Th_S$ | $p_s > Th_S$ | no | V + H |

In FIGS. 22 to 25 we present an example of decision diagram for several splits decision, using probabilities as defined before and 2 thresholds: $t_m$ for the low threshold, deciding if there is no boundaries, $t_M$ for the high threshold, deciding if there is a boundary. In the figures. $M_x$ refers to the probability of having a boundary at x (x being either v (vertical), h (horizontal), t (top), b (bottom), l (left), r type of split (quadtree, binary, asymmetric etc.)
size/shape of blocks,
Quantization Parameter (QP)
Color component
Slice type
temporal level in Random Access and Low Delay modes.
An example of threshold setting by tree level is given by:

$t_m[n] = \max(0, \alpha(n+1)^\beta)$ $t_M[n] = \min(1, \max(t_m[n]+\varepsilon, \alpha'(n+1)^{\beta'}))$ here $\alpha$, $\beta$, $\alpha'$, $\beta'$ and $\varepsilon$ are parameters which set the tradeoff between speedup and performance. Exemplary values are $\alpha=0.1$, $\beta=0.5$, $\alpha'=0.9$, $\beta'=0$ and $\varepsilon=0.1$. In the equations, n denotes the split level. For example, the first level of the split tree is 0. After each split, the tree level is increased by 1. Alternatively, the level is increased by 2 for quadtree level, and 1 for binary split. In the first equation, the low threshold, deciding the absence of boundary, follow an increasing function of the tree level, meaning that the absence of boundary is increasing with the tree depth. In the second equation, we take care that the high threshold, deciding the presence of a boundary, is always above the low threshold. The minimum uncertainty is controlled by E in this case.

As for threshold depending on size/shape of blocks. They can thus be stored in a 2 dimensions table or as a set:

|    | 4             | 8   | 16  | 32  | 64             |
|----|---------------|-----|-----|-----|----------------|
| 4  | $T_{4 \times 4}$  | ... | ... | ... | $T_{4 \times 64}$  |
| 8  | ...           | ... | ... | ... | ...            |
| 16 | ...           | ... | ... | ... | ...            |
| 32 | ...           | ... | ... | ... | ...            |
| 64 | $T_{64 \times 4}$ | ... | ... | ... | $T_{64 \times 64}$ |

To simplify the scheme, it is experimentally coherent to approximate that the thresholds can be symmetric for horizontal/vertical blocks, i.e. $T_{ijx} = T_{jxi}$, reducing the number of thresholds to optimize.

One advantage of the proposed methods is that they can accelerate the decision time for an encoder to determine a partitioning of a block.

The aforementioned embodiments have been described with respect to an encoder or encoding operation. A decoder would simply interpret the splits generated at an encoder using the described embodiments in the same way as splits generated with an RDO process, or any other type of splitting embodiment.

Figure 19:
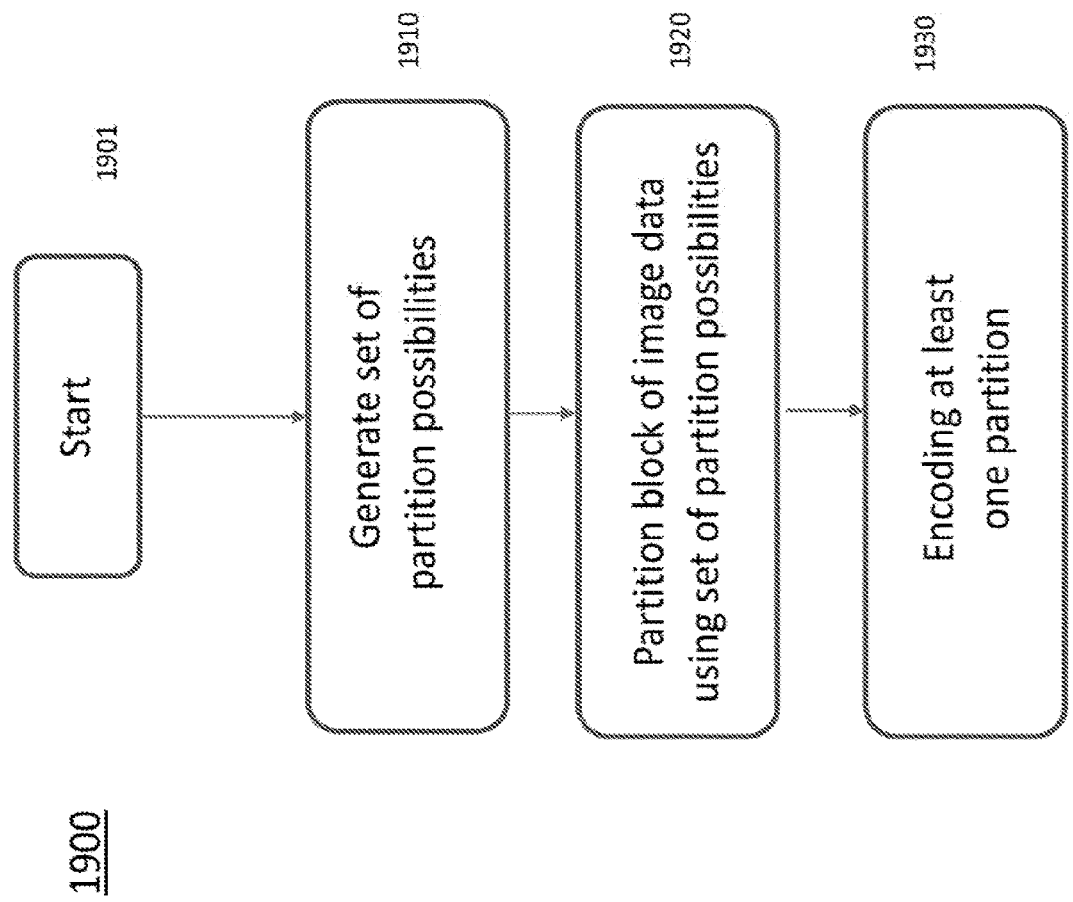
FIG. 19 illustrates one embodiment of a method using the described aspects.

FIG. 19 shows one embodiment of a method 1900 for coding a block of video data. The method commences at Start block 1901 and proceeds to block 1910 for generating a set of partition possibilities using a texture-based analysis of a block of image data based on partition boundary probabilities. Control then proceeds from block 1910 to block 1920 for partitioning the block of image data into two or more smaller blocks using the set of partition possibilities. Control then proceeds from block 1920 to block 1930 for encoding at least one smaller block.

Figure 20:
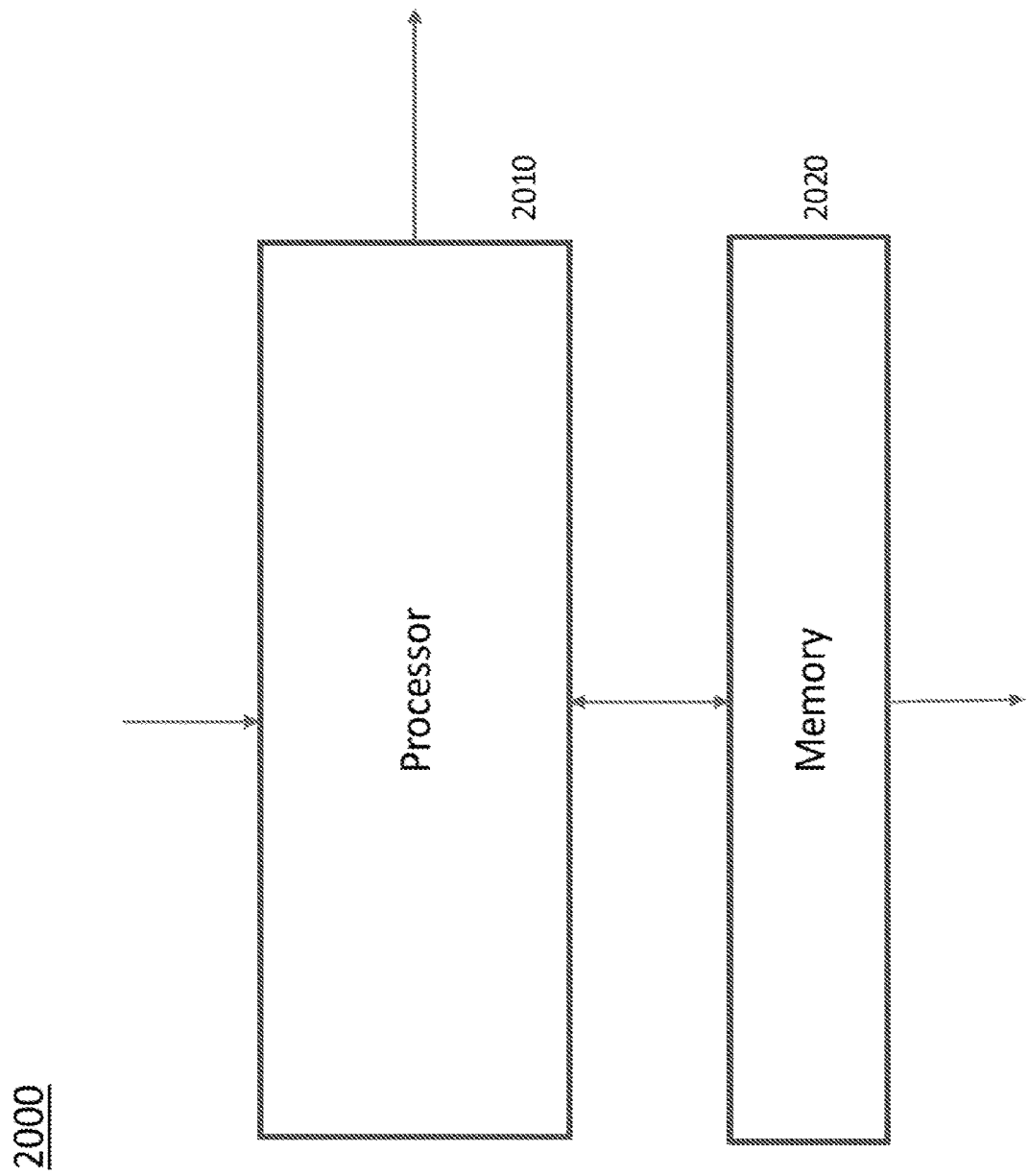
FIG. 20 illustrates one embodiment of an apparatus using the described aspects.

FIG. 20 shows one embodiment of an apparatus 2000 for coding or decoding a block of video data. The apparatus comprises Processor 2010 which has input and output ports and is in signal connectivity with Memory 2020, also having input and output ports. The apparatus can execute the aforementioned method embodiment, or any variations thereof.

The functions of the various elements shown in the figures can be provided using dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

Other hardware, conventional and/or custom, can also be included. Similarly, any switches shown in the figures are conceptual only. Their function can be carried out through the operation of program logic, through dedicated logic, through the interaction of program control and dedicated logic, or even manually, the particular technique being selectable by the implementer as more specifically understood from the context.

The present description illustrates the present ideas. It will thus be appreciated that those skilled in the art will be able to devise various arrangements that, although not explicitly described or shown herein, embody the present ideas and are included within its scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

In the claims herein, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

The invention claimed is:

1. An apparatus, comprising:
   a memory, and
   a processor, configured to:

obtain a set of partition possibilities for a block of image data based on partition boundary probabilities, wherein the partition boundary probabilities are determined based on a neural network and indicate respective probabilities of a plurality of potential boundaries being used to partition the block of image data;

partition the block of image data into two or more smaller blocks based on the set of partition possibilities; and encode at least one of the two or more smaller blocks.

2. The apparatus of claim 1, wherein the neural network includes a convolutional neural network.

3. The apparatus of claim 1, wherein the neural network is configured to determine the partition boundary probabilities based on the block of image data and causal pixels that neighbor the block of image data.

4. The apparatus of claim 3, wherein the causal pixels and the block of image data belong to a same frame, or the causal pixels are included in a decoded neighbor of a frame to which the block of image data belong.

5. The apparatus of claim 3, wherein the neural network is configured to determine the partition boundary probabilities further based on information that indicates how a neighbor of the block of image data is partitioned.

6. The apparatus of claim 1, wherein the partition boundary probabilities comprise respective boundary scores associated with partitioning the block of image data along the plurality of potential boundaries.

7. The apparatus of claim 1, wherein the set of partition possibilities is determined by comparing the partition boundary probabilities with threshold values for determining whether to split the block of image data along the plurality of potential boundaries or not to split the block of image data along the plurality of potential boundaries.

8. The apparatus of claim 7, wherein the threshold values are dependent on at least one of a quantization parameter, a tree depth, a block size, a block shape, a slice type, or a temporal level in a random access mode or a low delay mode.

9. The apparatus of claim 1, wherein the neural network is configured to indicate the partition boundary probabilities in a vector.

10. A method, comprising:

obtaining a set of partition possibilities for a block of image data based on partition boundary probabilities, wherein the partition boundary probabilities are determined based on a neural network and indicate respective probabilities of a plurality of potential boundaries being used to partition the block of image data;

partitioning the block of image data into two or more smaller blocks based on the set of partition possibilities; and encoding at least one of the two or more smaller blocks.

11. The method of claim 10, wherein the neural network includes a convolutional neural network.

12. The method of claim 10, wherein the partition boundary probabilities are determined by the neural network based on the block of image data and causal pixels that neighbor the block of image data.

13. The method of claim 12, wherein the causal pixels and the block of image data belong to a same frame, or the causal pixels are included to a decoded neighbor of a frame to which the block of image data belong.

14. The method of claim 12, wherein the partition boundary probabilities are determined by the neural network further based on information that indicates how a neighbor of the block of image data is partitioned.

15. The method of claim 10, wherein the partition boundary probabilities comprise respective boundary scores associated with partitioning the block of image data along the plurality of potential boundaries.

16. The method of claim 10, wherein the set of partition possibilities is determined by comparing the partition boundary probabilities with respective threshold values for determining whether to split the block of image data along the plurality of potential boundaries or not to split the block of image data along the plurality of potential boundaries.

17. The method of claim 16, wherein the threshold values are dependent on at least one of a quantization parameter, a tree depth, a block size, a block shape, a slice type, or a temporal level in a random access mode or a low delay mode.

18. A non-transitory computer readable medium comprising program code instructions that, when executed by a processor, cause the processor to:

obtain a set of partition possibilities for a block of image data based on partition boundary probabilities, wherein the partition boundary probabilities are determined based on a neural network and indicate respective probabilities of a plurality of potential boundaries being used to partition the block of image data;

partition the block of image data into two or more smaller blocks based on the set of partition possibilities; and encode at least one of the two or more smaller blocks.

19. The non-transitory computer readable medium of claim 18, wherein, when executed by the processor, the program code instructions further cause the processor to determine the partition boundary probabilities based on the block of image data and causal pixels that neighbor the block of image data.

20. The non-transitory computer readable medium of claim 19, wherein, when executed by the processor, the program code instructions cause the processor to determine the partition boundary probabilities further based on information that indicates how a neighbor of the block of image data is partitioned.

* * * * *